US006427823B1

(12) United States Patent
Ishikawa et al.

(10) Patent No.: US 6,427,823 B1
(45) Date of Patent: Aug. 6, 2002

(54) CONVEYOR DEVICE

(75) Inventors: Yoshinobu Ishikawa, Hino; Yoshio Ogimura, Kawaguchi; Megumi Ookubo, Fuchu, all of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/926,329

(22) PCT Filed: Apr. 14, 2000

(86) PCT No.: PCT/JP00/02463

§ 371 (c)(1), (2), (4) Date: Oct. 15, 2001

(87) PCT Pub. No.: WO00/63104

PCT Pub. Date: Oct. 26, 2000

(30) Foreign Application Priority Data

Apr. 15, 1999 (JP) ........................................... 11-08197

(51) Int. Cl.[7] ............................................ B65G 21/00
(52) U.S. Cl. .................................... 198/330; 198/832.1
(58) Field of Search ................................ 198/321, 330, 198/331, 832.1

(56) References Cited

U.S. PATENT DOCUMENTS 3,677,388 A * 7/1972 Boltrek et al. .......... 198/330 X
4,535,880 A * 8/1985 Boltrek ....................... 198/330

FOREIGN PATENT DOCUMENTS

| | | | | |
|---|---|---|---|---|
| DE | 2252763 | * | 5/1974 | ................ 198/330 |
| JP | 56-12288 | | 2/1981 | |
| JP | 61-19551 | | 1/1986 | |
| JP | 09-105446 | | 4/1997 | |

* cited by examiner

*Primary Examiner*—James R. Bidwell
(74) *Attorney, Agent, or Firm*—Oblon, Spivak, McClelland, Maier & Neustadt, P.C.

(57) ABSTRACT

A conveyor apparatus 20 according to the present invention comprises a tread guide rail 4 which is provided on a structure 120, and a plurality to treads 2 which moves along the tread guide rail 4. The plurality of treads 2 are connected by a chain 5 having pin rollers *5a*. An eccentrically rotatable eccentric crank shaft 8 is connected to a rotation drive unit 6. The eccentric crank shaft 8 is connected to an oscillating body 10 which oscillates in accordance with the eccentric rotation of the eccentric crank shaft 8. The oscillating body 10 is provided with pin roller rolling teeth 11 having a trochoid tooth profile for giving thrust to the pin rollers 5a in accordance with the oscillation of the oscillating body 10.

33 Claims, 17 Drawing Sheets

CONVEYOR DEVICE

TECHNICAL FIELD

The present invention relates generally to a conveyor apparatus, such as an escalator or a passenger conveyor. More specifically, the invention relates to a conveyor apparatus having a long moving distance.

BACKGROUND ART

An escalator as an example of a conveyor apparatus has a plurality of treads which have guide rollers in the front and rear portions thereof. The plurality of treads are designed to be supported by the engagement of each guide roller with a tread guide rail which is installed in a structure, to move in a horizontal direction in the vicinity of the landing stage and head of the escalator while being maintained horizontally, and to move in an ascent or descent direction of about 30 degrees on the way from the vicinity of the landing stage to the vicinity of the head of the escalator. Usually, the plurality of treads are connected to each other by means of a chain. By driving this chain, all of the treads are designed to closely move in synchronism with each other.

As a drive unit for driving the chain, a system of a type for driving the end portion of the chain by means of a sprocket is adopted. This system is provided in the vicinity of the landing stage or the head of the escalator. However, in an escalator having a large floor height, the load applied to the chain is large, so that there are some cases where sufficient driving force can not be transmitted only by driving the end portion of the chain. Such a problem is not only limited to escalators, but it is also con to all of conveyor apparatuss having a long moving distance Conventionally, in order to move a series of long treads in an escalator having a large floor height or a passenger conveyor having a long moving distance, it has been proposed that drive units capable of applying driving force on the way of a long chain (in a portion other than end portions in which the chain turns back) (such drive units are disclosed in, erg., Japanese Patent Publication Nos. 1986-19551, 1986-41834, 1986-41836 and 1987-9520) are distributed.

Each of these drive units for applying driving force on the way of the chain comprises: a motor serving as a driving source; a reduction gear for amplifying driving force by over ten; and a chain driving force transmitting mechanism for transmitting the driving force to a stretching chain. If a sprocket is adopted as the chain driving force transmitting mechanism the contact ratio decreases since the chain is not wound onto the sprocket, therefore, as shown in, e.g., FIGS. 17(*a*) and 17(*b*) , in the chain driving force transmitting mechanism, a chain connected to treads 102 is formed as a toothed chain 105, and a driving side is formed by a driving sprocket 106 having a pin roller 108, so that the chain driving force transmitting mechanism utilizes the engagement of the pin roller 108 with the toothed chain 105.

However, the conventional chain driving force transmitting mechanism 100 shown in FIG. 17 requires special components, such as the toothed chain unlike a simple driving mechanism utilizing a chain sprocket for use in usual escalators.

In addition, since the toothed chain uses a long pitch link, the velocity of the end of one pitch of the toothed chain is more ununiform in the turning portion of the toothed chain than the usual chain, so that the toothed chain is turned back by means of a pseudo circular guide rail although the usual chain is turned back by means of a sprocket. Therefore, it is difficult to use an inexpensive standard driving mechanism, which is driven by a circular sprocket rotating at a constant velocity, in the turning portion.

The inventor found a reduction gear using a trochoid tooth profile for carrying out a linear driving before the present invention has been made. Such a reduction gear is disclosed in, e.g., Japanese Patent Laid-Open Nos. 5-187502, 6-174043 and 9-105446, and is used in the field of industrial robot, automatic machine and so forth.

For example, as shown in FIG. 18, Japanese Patent Laid-Open No. 9-105446 discloses a reduction gear wherein pins 106 are mounted on a translation body 107 at regular intervals (even pitches) along the translation body 107, and if an eccentric crank 108 connected to a motor makes one rotation, an oscillating plate 111 having a trochoid tooth profile 110 makes one oscillation, so that the portion of the trochoid tooth profile 110 moves the pins 106 forward by one pitch at a constant velocity. That is, according to this reduction gear, the translation body 107 moves by one pin pitch per one rotation of the motor. Conventionally, such a mechanism has been utilized as a reduction gear for an industrial robot or the like.

DISCLOSURE OF THE INVENTION

It is therefore an object of the present invention to provide a conveyor apparatus which can be applied to an escalator having a large floor height, a passenger conveyor having a long moving distance and so forth and which is capable of being a single driving mechanism serving as two mechanism elements of both a reduction gear and a chain driving force transmitting mechanism which have been conventionally essential for conventional driving mechanisms.

It is another object of the present invention to provide a conveyor apparatus which has a distributed driving mechanism using a conventional inexpensive standard conveyor drive unit of a chain sprocket in a chain turning portion and which is capable of being used with conventional drive unit.

In order to accomplish these other objects, a conveyor apparatus according to the present invention comprises: a tread guide rail which is provided on a structure; a plurality of treads which move along the tread guide rail; a chain having a pin roller and connecting the plurality of treads in the form of an endless loop; a rotation drive unit which is mounted on the structure; and driving means for converting a rotational motion, which is transmitted fruit the rotation drive unit via an eccentric shaft, into an oscillating motion of an oscillating body having a trochoid tooth profile, to give thrust to the pin roller which engages the trochoid tooth profile.

The driving means preferably comprises an eccentric crank shaft which is connected to the rotation drive unit and which eccentrically rotates; an oscillating body which is connected to the eccentric crank shaft and which oscillates in accordance with the eccentric rotation of the eccentric crank shaft; and trochoid-shaped pin roller rolling teeth which are provided on an end portion of the oscillating body and which give thrust to the pin roller in accordance with the oscillation of the oscillating body.

According to the conveyor apparatus of the present invention, the pin rollers of the chain are arranged at regular intervals (even pitches) by the links of the chain, and are guided on the tread guide rail, so that the pin rollers are arranged in the same state as pins mounted on a translation body at regular intervals (even pitches). When the eccentric crank shaft rotates, the oscillating body oscillates, so that the pin roller contacting the trochoid tooth profile of the oscillating body can move forward by one pitch every one rotation of the eccentric crank shaft. In such a mechanism for converting rotational motion to oscillating motion of the trochoid tooth profile, the chain driving mechanism itself also functions an a reduction gear.

BEST MODE FOR CARRYING OUT THE INVENTION

Referring now to the accompanying drawings, the preferred embodiments of the present invention will be described below.

First Preferred Embodiment

Figure 1:
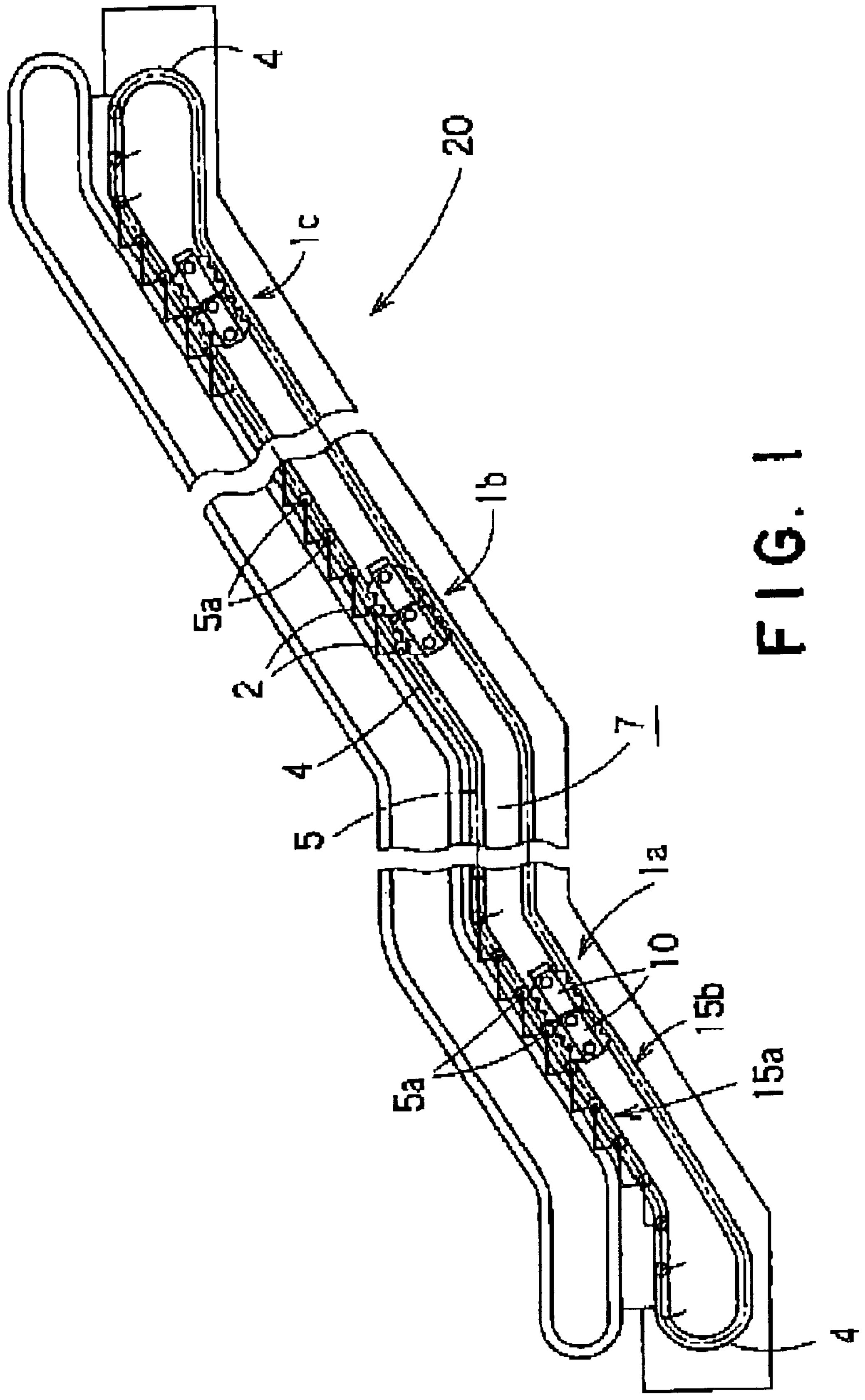
FIG. 1 is a schematic diagram showing the construction of the first preferred embodiment of a conveyor apparatus according to the present invention.

FIG. 1 is a schematic diagram showing the construction of the first preferred embodiment of a conveyor apparatus according to the present invention. As shown in FIG. 1, the conveyor apparatus 20 in the first preferred embodiment of the present invention is formed as an escalator, and comprises a tread guide rail 4, which is provided on a structure 7 so as to round, and a plurality of treads 2 which moves along the tread guide rail 4. The tread guide rail 4 in this preferred embodiment is formed of a pair of members having a C-shaped cross section, the opening portion of which faces inward (see FIG. 3).

Figure 2:
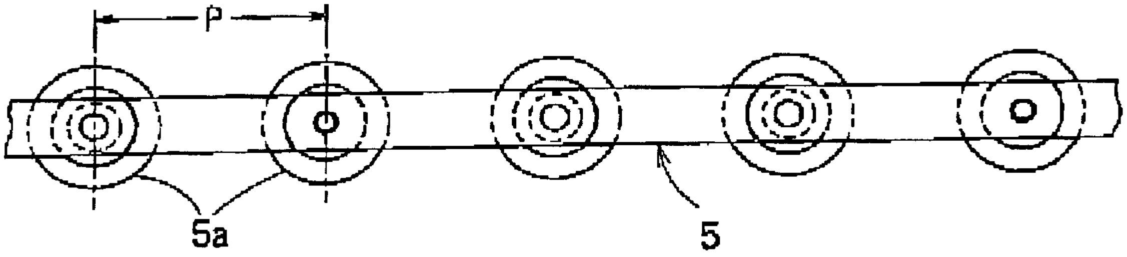
FIG. 2 is a schematic diagram showing the construction of a chain of the conveyor apparatus of FIG. 1.

The plurality of treads 2 are connected to each other in the form of a loop by means of a pair of chains 5 (on both sides in directions perpendicular to the plane of FIG. 1) having pin rollers 5*a*. The pin rollers 5*a* are rotatably mounted on the chain 5 at regular intervals (even pitches) as shown in FIG. 2.

The pin rollers 5*a* in this preferred emodiment is designed to engage the tread guide tail 4 to guide the treads 2 along the tread guide rail 4, That is, each of the pin rollers 5*a* also serves a forward guide roller for a corresponding one of the treads 2. However, each of rearward guide rollers 50 has a larger diameter than that of each of the pin rollers 5*a*, and is designed to travel on a rear wheel guide rail 40 which is provided on a structure 120 (see FIG. 3).

On the way of the tread guide rail 4, i.e., in a predetermined portion other than end portions in which the tread guide rail 4 turns back, three driving mechanisms 1*a*, 1*b* and 1*c* for transmitting driving force to the chain 5 are arranged so as to be distributed. The tread guide rail 4 is partially removed in portions in which the driving mechanisms 1*a*, 1*b* and 1*c* are arranged.

Figure 3:
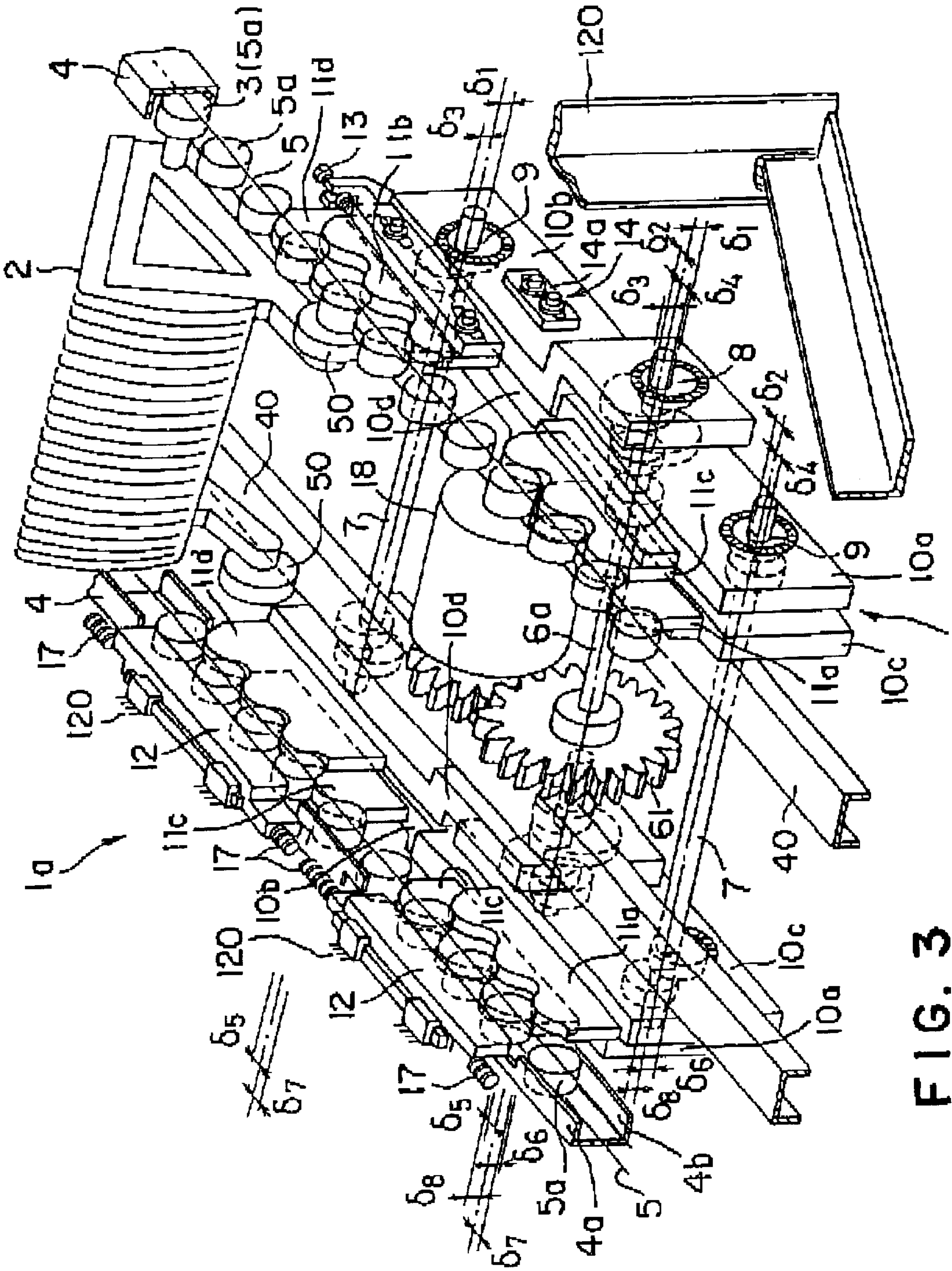
FIG. 3 is a schematic diagram showing the detailed construction of a driving mechanism portion of the conveyor apparatus of FIG. 1.

FIG. 3 is a detailed diagram of the portion of the driving mechanism 1*a*. Since other driving mechanisms 1*b* and 1*c* substantially have the same construction as that of the driving mechanism 1*a* shown in FIG. 3, only the driving mechanism 1*a* will be described to omit the descriptions of the driving mechanisms 1*b* and 1*c*.

As shown in FIG. 3, the driving mechanism 1*a* has an electric motor 7 (rotation drive unit) which is mounted on the structure 120. The electric motor 18 is capable of producing driving force and stop holding force. The electric motor 18 is connected to an eccentric crank shaft 6 via a reduction mechanism 61 of a gear, and the eccentric crank shaft 6 is connected to an eccentric disc 6 at an eccentricity amount of $\delta$ ($\delta 1 \sim \delta 8$)—Thus, the eccentric disc 8 is designed to eccentrically rotate about the shaft center of the eccentric shaft 6 at the eccentricity amount of $\delta$.

In this preferred embodiment, in addition to the eccentric crack shaft 6, there are provided two idler crank shafts 7, on each of which an eccentric disc 9 being driven so as to eccentrically rotate at the same eccentricity amount of $\delta$ as that of the eccentric disc 8 is mounted.

The eccentric disc 8 of the eccentric crank shaft 6 is connected to four oscillating plates 10 (10*a*~10*d*) as oscillating bodies which oscillate in accordance with the eccentric rotation of the eccentric disk 9. The four oscillating plates 10 are divided into two pairs of plates, and arranged forward and rearward to extend in the circulating directions of the chain 5. The two oscillating plates 10 arranged forward to extend are connected to the eccentric disc 9 of one of the idler eccentric crank shafts 7, and the oscillating plates 10 arranged rearward to extend are connected to the eccentric disc 9 of the other idler eccentric crank shaft 7.

Each of the oscillating plates 10 is rotatably supported on a corresponding one of the eccentric crank shafts 6 and 7.

The relative positional relationship between the four oscillating plates 10 is such a relationship that the phase shifts of their eccentric angles are equally distributed to be 90 degrees. Moreover, each of the four oscillating plates 10 is provided with a mass balance adjusting device 14 capable of adjusting the weight and mounting position of a fine additional weight 14*a*.

On the top and bottom end portions of each of the oscillating plates 10, trochoid-shaped pin roller rolling teeth 11 (11*a*~11*d*) are detachably mounted. However, the structure of the bottom end side of each of the oscillating plates 10 is not shown in FIG. 3 to simplify the figure. The pin roller rolling teeth 11*a* through 11*d* are arranged so as to be capable of sequentially engaging the pin rollers 5*a* of the chain 5 in accordance with the oscillation of the oscillating plates 10*a* through 10*d* to apply thrust. In this preferred emodiment, the pin roller rolling teeth 11 of the top and bottom end portions of each of the oscillating plates 10 are designed to engage both of the pin rollers 5*a* on the approach route side 15*a* and return route side 15*b* (see FIG. 1) of the reciprocating circulating chain 5, respectively, to apply thrust. The corner portions of the pin roller rolling teeth 11 are rounded to avoid the occurrence of concentrated stress.

In this preferred embodiment, each of the oscillating plates 10 is provided with a position fine control function 13 capable of adjusting the mounting positions of the pin roller rolling teeth 11 and the oscillating plates 10 in the circulating directions of the chain 5. The position fine control function 13 can be simply formed of, e.g., a long hole and a bolt, The structure (e.g., a truss structure) 120 is provided with a back face guide plate 12 for guiding the pin rollers 5*a* on the opposite side (the upper side in the approach route shown in the figurer and the bottom side in the return route (not shown)) to a side on which the pin roller rolling teeth 11 are positioned with respect to the pin rollers 5*a*. The back face guide plate 12 is arranged so as to correspond to each of the oscillating plates 10 which are divided into two pairs of plates and which are arranged forward and rearward in circulating directions of the chain 5.

The back face guide plate 12 is capable of linearly moving in a moving amount of an eccentricity amount of d or less of the eccentric disc 8 with respect to the eccentric crank shaft 6 in the circulating directions of the chain 5 in accordance with the frictional force on the contacting pin rollers 5*a* while the pin rollers 5*a* are sandwiched between the back face guide plate 12 and a corresponding one of the oscillating plates 10. The back face guide plate 12 is provided with a back face guide plate returning device 17, e.g., a spring device, for returning the linearly moved back face guide plate 12 to the original position.

In addition, the back face guide plate 12 is formed so as to have such an extent of hardness that it does not damage the pin rollers 5*a*, and is exchangeable.

Figure 4:
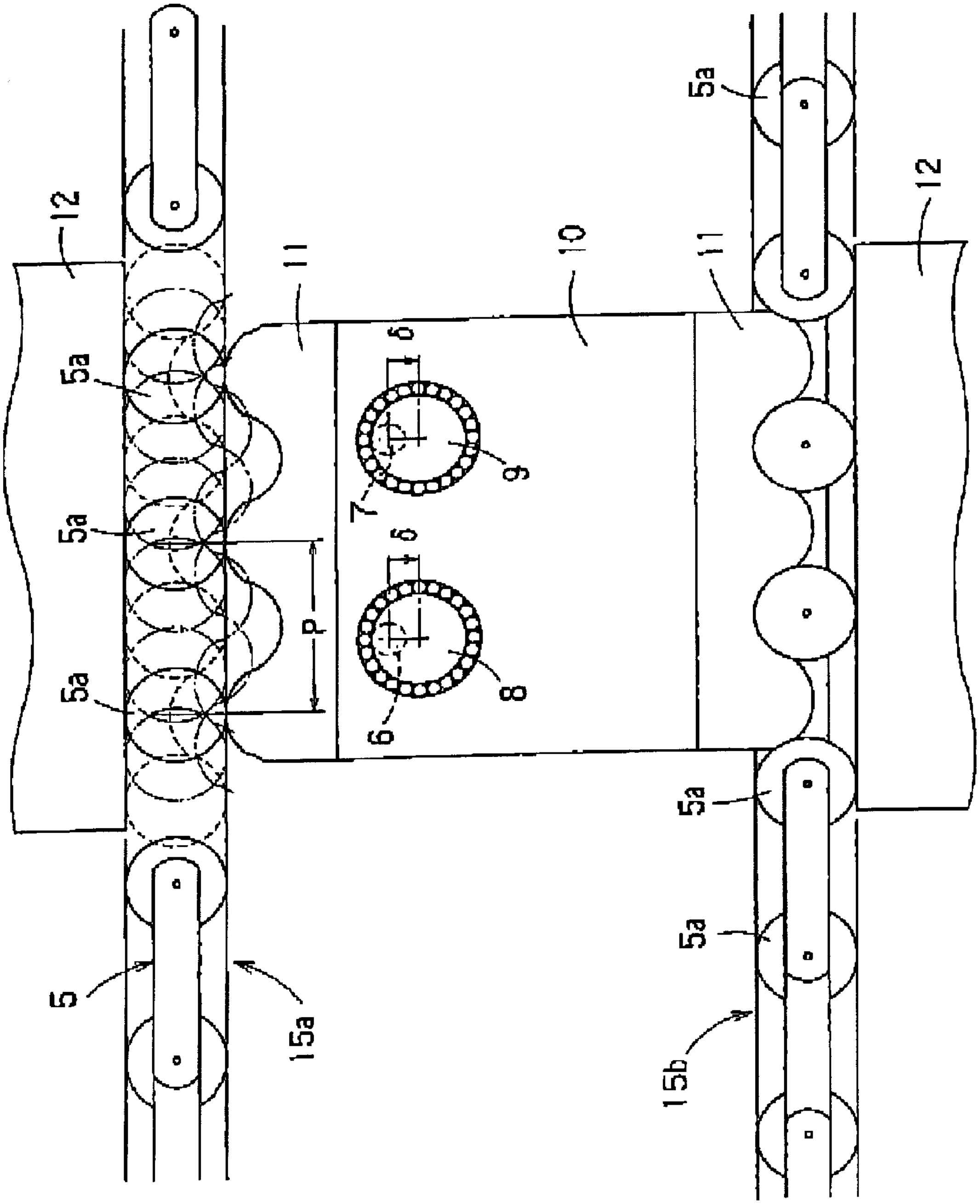
FIG. 4 is an illustration for explaining the principle of operation of pin roller rolling teeth and pin rollers.

Referring to FIG. 4, the operation of this preferred embodiment with such a construction will be described below.

FIG. 4 is an illustration for explaining the principle of operation of the trochoid-shaped pin roller rolling teeth 11 and the pin rollers 5*a*.

The pin rollers 5*a* of the chain 5 are mounted at even pitches P as described above, and support thereon the back faces of the pin rollers 5*a* from the opposite side to the pin roller rolling teeth 11.

From this state, as shown in FIG. 4, if the electric motor 19 is driven to cause the rotation of the gear 61 and an eccentric crank shaft 6 and the eccentric rotation of the eccentric disc 8, the eccentric disc 9 of the idler eccentric crank shaft 7 is driven so as to eccentrically rotate at the sane eccentricity amount, so that the oscillating plate 10 oscillates while being maintained to be parallel to the circulating directions of the chain 5. By the oscillating motion of the four oscillating plates 10 (10*a*~10*d*), the trochoid-shaped pin roller rolling teeth 11 (11*a*~11*d*) sequentially engage the pin rollers 5*a* to continuously transmit thrust, so that the pin rollers 5*a* move forward by one pitch P.

If the oscillating plates 10 continuously oscillate, the pin roller rolling teeth 11 give thrust to the chain 5 via the pin rollers 5*a* to drive the chain 5. Furthermore, the electric motor 6 may be an inexpensive geared motor with gears of about one stage. In this case, the reduction mechanism 61 for the electric motor 6 can be omitted.

The pin roller rolling teeth 11 also applies force to the pin rollers 5*a* in a direction other than the moving directions (the circulating directions of the chain 5) when transmitting thrust to the pin rollers 5*a*. However, since the guide rail 4 is formed of the members having the C-shaped cross section, the movement of the pin rollers 5*a*, i.e., the movement of the treads 2, is smoothly carried out.

By the construction that the pin roller rolling teeth 11 are detachably mounted on the oscillating plate 10, only the pin roller rolling teeth 11 can be detached from the oscillating plate 10 to be exchanged, and only the pin roller rolling teeth 11 can be produced by mass production. Thus, maintenance costs are decreased. Of course, the pin roller rolling teeth 11 and the oscillating plates 10 may be formed of an integral molding.

The mounting error of the pin roller rolling teeth 11 on each of the distributed driving mechanisms 1*a*, 1*b* and 1*c* can be easily adjusted by means of the position fine control device 13 shown in FIG. 3.

In this preferred emodiment, the pin roller rolling teeth 11 are distributed and arranged forward and rearward in the circulating directions of the chain 5 so that two of the pin roller rolling teeth 11 make a pair, and each of the pairs of the pin roller rolling teeth 11 pushes the pin rollers 5*a* having a limited width L. Therefore, the corner portions can be sufficiently rounded in comparison with a case where the four pin roller rolling teeth 11 make a set. Thus it is possible to inhibit the occurrence of concentrated stress due to edge portions. In addition, since the thickness of the pin roller rolling teeth 11 is ensured, it is possible to sufficiently ensure the strength of the pin roller rolling teeth 11, and it is possible to improve the durability and reliability of the pin roller rolling teeth 11.

Moreover, since the phase shift of the eccentric angle of each of the four oscillating plates 10*a* through led is w equally distributed at 90°, the deviating force between the oscillating plates 10*a* through 10*d* is canceled, so that it is possible to inhibit the occurrence of oscillation. If oscillation occurs, the weight and mounting position of the fine additional weight 14*a* can be changed by means of the mass balance adjusting device 14 shown in FIG. 3, so that it is possible to easily the mass balance. Thus, it is possible to inhibit fatigue failure and mechanical damage due to oscillation.

According to this preferred embodiment, the pin roller rolling teeth 11 are provided on both sides of the top and bottom end portions of the oscillating plates 10, so that thrust can be applied to the pin rollers 5*a* of both of the approach route side 15*a* and return route side 15*b* of the reciprocating circulating chain 5. Therefore, the mechanical efficiency of power transmission can be excellent. In this case, only one side of the oscillating plates 10 can be provided with the pin roller rolling teeth 11.

By forming the back face guide plate 12 of a material having such an extent of hardness that it is consumed prior to the consumption of the pin rollers 5*a*, the pin roller 5*a* is not damaged, so that the frequency of exchange of the chain 5 is reduced. In addition, since the back face guide plate 12 to be consumed is formed of a separate part, it is possible to easily exchange the plate to a new plate.

While the pin roller rolling teeth 11 of the oscillating plate 10 push the pin rollers 5*a*, the back face guide plate 12 for the back face of the pin rollers 5*a* linearly moves without sliding with the pin rollers 5*a*, and when the pin roller rolling teeth 11 of the oscillating plate 10 leaves the pin rollers 5*a*, the back face guide plate 12 returns to the original position by the pressing force of the back face guide plate returning device 17, so that it is possible to prevent wearing due to sliding to improve durability and reliability.

While the conveyor apparatus 20 in this preferred embodiment has been constructed as an escalator, the conveyor apparatus 20 may be constructed as a horizontal passenger conveyor.

Second Preferred Embodiment

Figure 5:
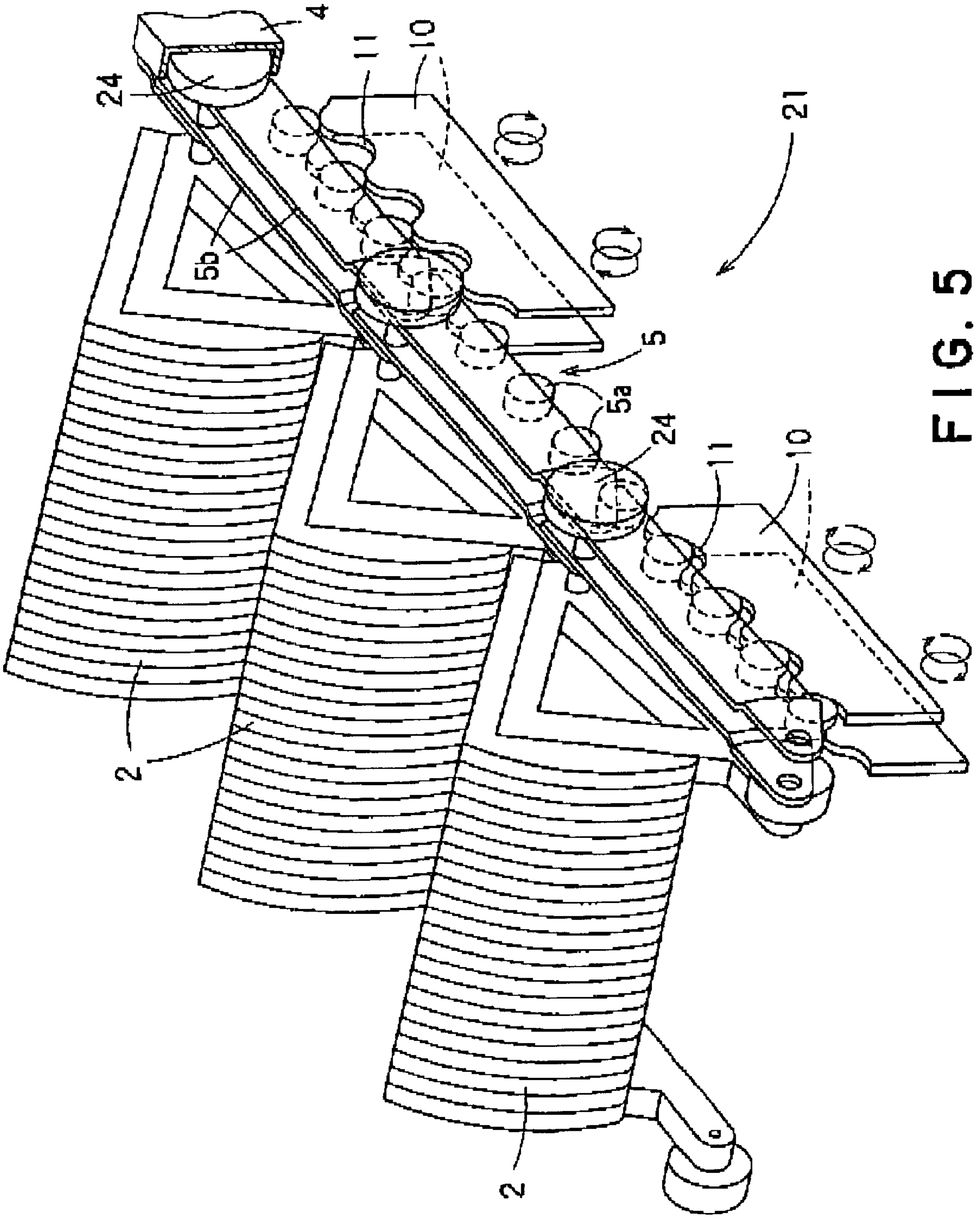
FIG. 5 is a schematic diagram showing the detailed construction of a driving mechanism portion of the second preferred embodiment of a conveyor apparatus according to the present invention.

Referring to FIG. 5, the second preferred embodiment of a conveyor apparatus according to the present invention will be described below. FIG. 5 is a schematic diagram showing the construction of the portion of a driving mechanism 21 of the second preferred embodiment of a conveyor apparatus according to the present invention.

As shown in FIG, 5, in the conveyor apparatus 20 in this preferred embodiment, a chain 5 comprises a large number of pairs of link 5*b* which have a length corresponding to one pitch between adjacent treads 2 and which are connected to each other. On the front end portion of each of the links 5*b*, guide rollers 24 separated from pin rollers 5*a* are provided. Each four of the pin rollers 5*a* are mounted between the pair of links 5*b* so as to be arranged at regular intervals when the links 5*b* are aligned with each other.

Only the guide roller 24 engages a tread guide rail 4, and the pin rollers 5*a* of the chain 5*a* does not engage the tread guide rail 4. The tread guide rail 4 has a C-shaped cross section, and the guide rollers 24 roll on the peripheral face thereof, so that it is possible to regulate the vertical movement of the guide rollers 24. Thus, the tread guide rail 4 serves as a back face guide plate for guiding the pin rollers 5*a* of the chain 5 on the opposite side to a side on which pin roller rolling teeth 11 are arranged.

Other constructions are substantially the same as those of the first preferred embodiment shown in FIGS. 1 through 3.

In the second preferred embodiment, the same reference numbers are given to the same portions as those in the first preferred embodiment shown in FIGS. 1 through 3 to omit the detailed descriptions thereof.

According to this preferred embodiment, the links 5*b* of the chain 5 have the length corresponding to one pitch between adjacent treads 2, it is possible to reduce the number of links. On the other hand, it is possible to easily increase the number of engagements of the oscillating plates 10 with the pin roller rolling teeth 11 by increasing the number of the pin rollers 5*a*, so that it is possible to easily enhance the ratio of reduction (reduction ratio) utilizing a trochoid tooth profile.

Third Preferred Embodiment

Figure 6:
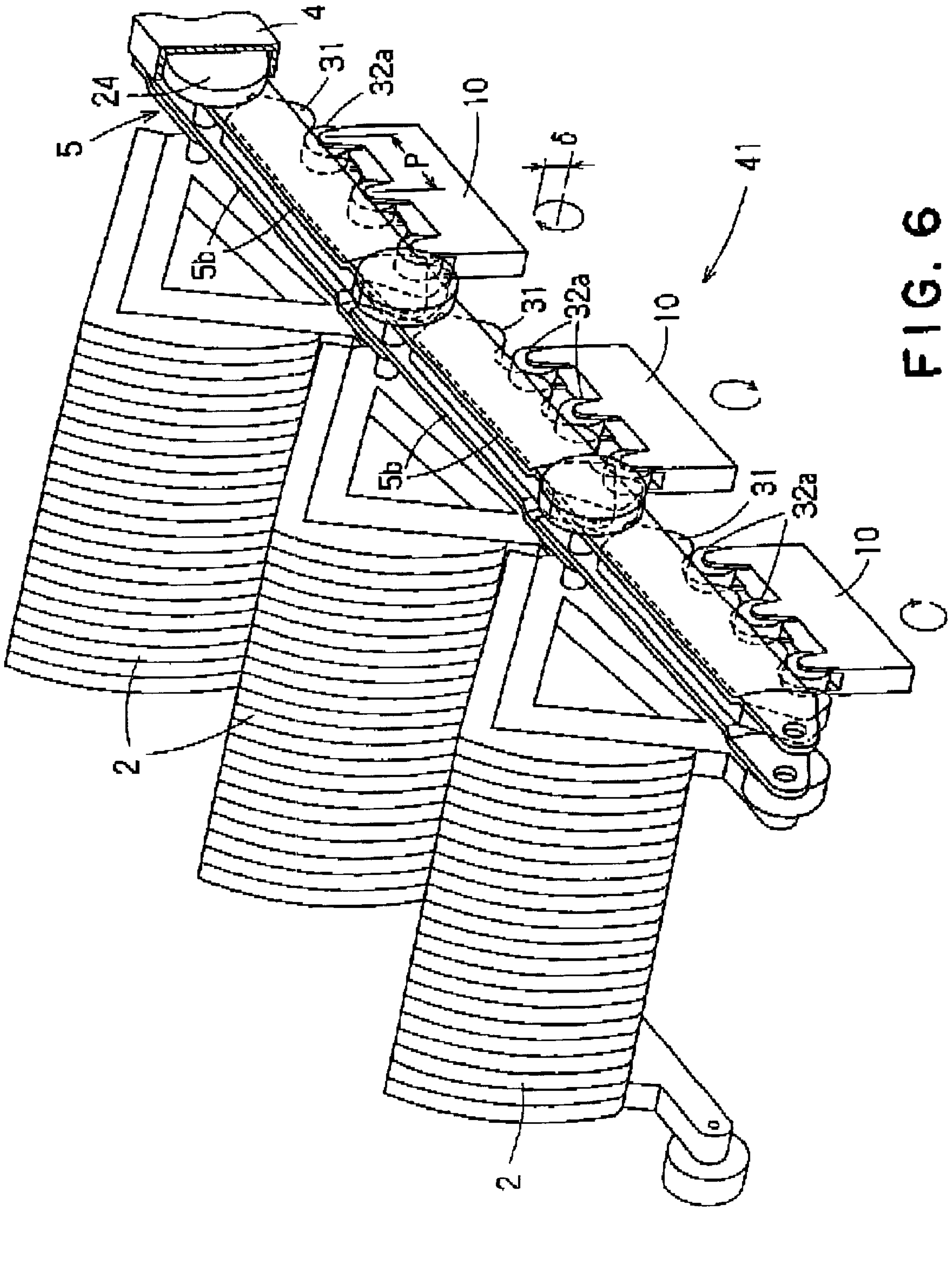
FIG. 6 is a schematic diagram showing the detailed construction of a driving mechanism portion of the third preferred emodiment of a conveyor apparatus according to the present invention.

Referring to FIG. 6, the third preferred emodiment of a conveyor apparatus according to the present invention will be described below. FIG. 6 is a schematic diagram showing the construction of the portion of a driving mechanism 41 of the third preferred embodiment of a conveyor apparatus according to the present invention.

As shown in FIG. 6, in the conveyor apparatus 30 in this preferred embodiment, a trochoid-shaped pin roller rolling teeth 31 is formed on a link 5*b* of a chain 5, and eccentric oscillating pin rollers 32*a* for giving thrust to the pin roller rolling teeth 31 in accordance with the oscillation of an oscillating plate 10 are provided on the top and bottom end portions of the oscillating plate 10.

Other constructions are substantially the same as those in the second preferred embodiment shown in FIG. 5. In the third preferred emodiment, the same reference numbers are given to the same portions as those in the second preferred embodiment shown in FIG. 5 to omit the detailed descriptions thereof.

The operation of this preferred embodiment is substantially the same as that of the second preferred embodiment, except that the mounting relationship between the pin rollers 32*a* and the pin roller rolling teeth 31 is opposite to that in the second preferred embodiment.

In the driving mechanism common to the conveyor aparatuss in the first preferred embodiments which have been described above, the distribution of the eccentric phase angle of each of the oscillating plates 10*a* through 10*d* connected to the eccentric crank shaft 6, and the arrangement of each of the pin roller rolling teeth 11*a* through 11*d* will be described below in more detail. Since the basic components of the driving mechanism are common to those of the driving mechanism 1*a* of FIG. 3, the same reference numbers as those in FIG. 3 are given thereto to describe them.

Figure 7:
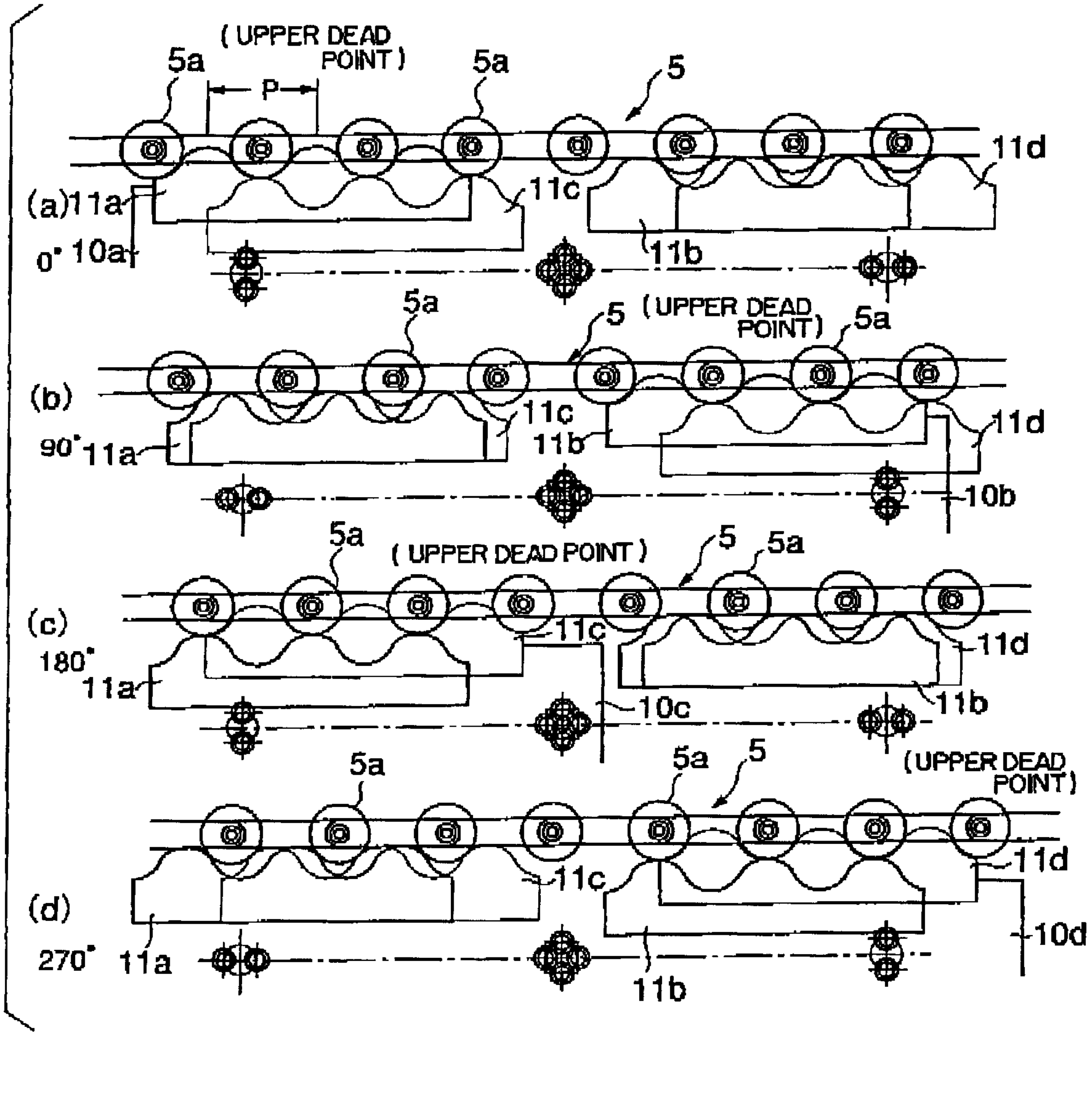
FIG. 7 is an illustration showing the position of each of pin roller rolling teeth while an eccentric crank shaft makes one rotation.

FIG. 7 is an illustration showing the variation in position of engagement of the pin roller rolling teeth 11*a* through 11*d*, which are mounted on each of the oscillating plates 10*a* through 10*d* arranged as shown in FIG. 3, with the pin rollers 5*a* while the crank shaft 6 makes one rotation.

The pin roller teeth 11*a* through 11*d* have the same trochoid tooth profile. Thus, the cost of producing a complicated trochoid tooth profile is reduced. However, the phases of the trochoid tooth profile are designed to be shifted to change the positions of engagements of the pin roller rolling teeth 11*a* through 11*d* with the pin rollers 5*a* of the chain 5 so that the pin roller rolling teeth 11*a* through 11*d* can be meshed with the pin rollers 5*a* to smoothly move the chain 5 by a distance which is equal to the pitch P of the chain while the eccentric crank shaft 6 makes one rotation.

That is, the eccentric phase angles of the oscillating plates 10*a*, 10*b*, 10*c* and 10*d* are shifted by 90°. Assuming that the eccentric phase angle difference of each of the oscillating plates 10*b* through 10*d* with respect to the oscillating plate 10*a* is $\Delta\Phi i$, the phase shifts of the trochoid tooth profile of the pin roller rolling teeth 11*a* through 11*d* mounted on the oscillating plates 10*a* through 10*d* are shifted by $\Delta p = p \times \Delta\Phi i/360$ in the traveling direction of the chain 5 with respect to the relative positional relationship to the pin rollers 5*a* (P is the pitch of the trochoid tooth profile, and equal to the pitch of the chain 5 in this case), Referring to FIG. 7, this will be specifically described as follows. FIG. 7(*a*) shows the positions of the respective pin roller rolling teeth 11*a* through 11*d* when the angle of rotation of the eccentric crank shaft 6 is 0° or 360°. On the basis of the pin roller rolling teeth 11*a*, the phase of the trochoid tooth profile of the pin roller rolling teeth 11*b* having an eccentric phase angle difference of 90° from the pin roller rolling teeth 11*a* is shifted by $P \times 1/4$ ($P \times 90/360$) in the chain traveling direction from the trochoid tooth profile of the pin roller rolling teeth 11_a_ as far as the relative positions to the pin rollers sa are concerned. Similarly, with respect to the relationship between the pin roller rolling teeth 11_b_ and the pin roller rolling teeth 11_c_, the eccentric phase angle difference is 90°, so that the phase shift of the trochoid tooth profile with respect to the relative positions to the pin rollers 5_a_ is P×½(P×180/360). With respect to the pin roller rolling teeth 11_d_, the phase shift is P×¾(P×270/360).

Such a relative phase shift between the trochoid tooth profile and the pin roller 5_a_ does not vary even if the angle of rotation of the eccentric crank shaft 6 is 90° (FIG. 7(_b_)), 180° (FIG. 7(_c_)) or 270° (FIG. 7(_d_)). Therefore, while the eccentric crank shaft 6 makes one rotation, each of the pin roller rolling teeth 11_a_ through 11_d_ can smoothly move the chain 5 by the pitch P in accordance with the oscillation of the oscillating plates 10_a_ through 10_d_ while the positions of engagement with the pin rollers 5_a_ are sequentially changed.

In the driving mechanist with the above described construction, the set of the oscillating plates 10_a_, 10_b_ and the set of the oscillating plates 10_b_, 10_d_ are distributed forward and rearward to cancel the inertial force during oscillation. Therefore, the inertial force does not act on the eccentric crank shaft 6 and idler concentric crank shaft 8 as an excitation force, so that it is possible to inhibit the occurrence of vibrations and noises.

The phase shifts of the trochoid tooth profiles of the pin roller rolling teeth 11_a_ through 11_d_ in the chain traveling direction have been described above. In order to allow the pin roller rolling teeth 11_a_ through 11_d_ to oscillate to apply appropriate thrust to the pin rollers 5_a_, the tread guide rail 4 and the back face guide plate 12 must appropriately guide the pin rollers 5_a_, and the pin roller rolling teeth 11_a_ through 11_d_ must be prevented from interfering with the tread guide rail 4 or the back face guide plate 12. Therefore, referring to FIG. 8, the tread guide rail 4 and the back face guide plate 12 will be described below in detail.

Figure 8:
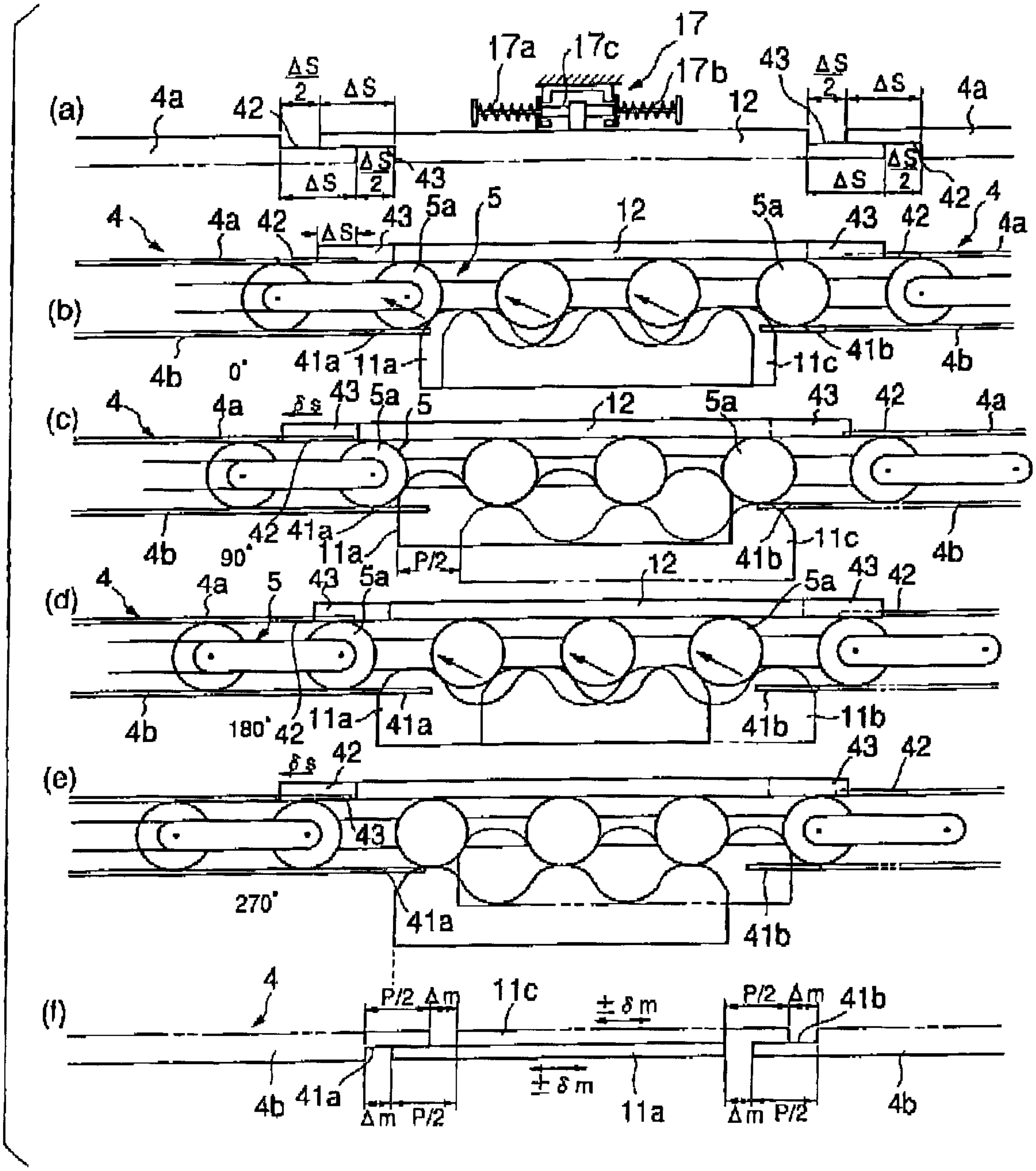
FIG. 8 is an illustration showing the movement of each pin roller rolling teeth while an eccentric crank shaft makes one rotation, and the positional relationship between a tread guide rail and a back face supporting plate.

FIG. 8 is an illustration showing the positional relationship between the tread guide rail 4 and the back face guide plate 12 with respect to the set of the pin roller rolling teeth 11_a_ and 11_c_ of the pin roller rolling teeth 11_a_ through 11_d_.

As shown in FIG. 31 the tread guide rail 4 is a guide rail having an U-shaped cross section wherein an upper guide portion 4_a_ and a lower guide portion 4_b_ serve as rolling guide surfaces for the pin rollers 5_a_.

FIG. 8(_a_) is a plan view of the upper guide portion 4_a_ when the tread guide rail 4 is viewed from the top, and FIGS. 8(_b_) through 8(_e_) show the movement of the pin roller rolling teeth 11_a_and 11_c_ when the eccentric crank shaft 6 is rotated by every 90°. FIG. 8(_f_) is a plan view showing the lower guide portion 4_b_ of the tread guide rail 4. Furthermore, the set of the pin roller rolling teeth 11_b_ and 11_d_ is not shown in FIG. 8 since it is the same as the set of the pin roller rolling teeth 11_a_ and 11_c_.

The tread guide rail 4 is provided with a discontinues portion so as not to be positioned just above the pin roller rolling teeth 11_a_ and 11_c_. The pin roller rolling teeth 11_a_ and 11_c_ are designed to pass through the discontinues portion of the tread guide rail 4 to oscillate toward the top dead center or the bottom dead center. As shown in FIG. 8(_f_), the pin roller rolling teeth 11_a_ and 11_c_ oscillate in parallel to the tread guide rail 4, and when the pin roller rolling teeth 11_a_ is positioned at the top dead center or the bottom dead center (see FIG. 8(_c_) or 8(_d_)), the phase difference of the pin roller rolling teeth 11_a_ from the pin roller rolling teeth 11_c_ is P/2 in length directions (P is the pitch of the trochoid tooth profile).

In order to prevent the pin roller rolling teeth 11_a_ and 11_c_ oscillating in such a phase difference from interfering with the tread guide rail 4, a part of each of end portions of the lower guide portion 4_b_ of the tread guide rail 4, which face each other via the pin roller rolling teeth 11_a_ and 11_c_ of the lower guide portion 4_b_, is cut out in a rectangular shape to form recessed portions 41_a_ and 41_c_, so that the lower guide portion 4_b_ has a stepped shape as shown in FIG. 8(_f_). Each of the recessed portions 41_a_ and 41_c_ is preferably half the width of the lower guide portion 4_b_, and has a length of at least P/2. In addition, when the pin roller rolling teeth 11_a_ and 11_c_ are positioned at the top dead center or the bottom dead center, respectively, as shown in FIGS. 8(_c_) and 8(_e_), a recess Δm remains in the recessed portions 41_a_ and 41_c_, so that the recessed portions 41_a_ and 41_c_ are set so as to overlap with the lower guide portion 4_b_ over a length of 0.28 P at the maximum Assuming herein that the moving mount of the pin roller rolling teeth 11_a_ and 11_c_ in the traveling direction of the chain 5 is ±δm, this δm is ±0.159 P during the traveling from FIG. 8(_b_) to FIG. 8(_d_) at the maximum in the relationship to the pitch P. Therefore, while the pin roller rolling teeth 11_a_ and 11_c_ oscillate, the recess Δm is always ensured, so that the lower guide portion 4_b_ does not interfere with the pin roller rolling teeth 11_a_ and 11_b_. In addition, the overlapping portion of the lower guide portion 4_b_ with the pin roller rolling teeth 11_a_ and 11_c_ is always ensured. Therefore, even if the tread guide rail 4 has the discontinuous portion, the pin rollers 5_a_ of the chain 5 move continuously and smoothly on the pin roller rolling teeth 11_a_ and 11_c_ from one end portion of the lower guide portion 4_b_ to the other end portion thereof.

On the other hand, as shown in FIG. 8(_a_), a part of each of end portions of the upper guide 4_a_ of the tread guide rail 42 which face each other via the back face guide plate 12, is also cut out in a rectangular shape to form a recessed portion 42 which has a predetermined length Δs. In the case of the upper guide 4_a_, each of both end portions of the back face guide plate 12 is also cut out to form a rectangular recessed portion 43. The back face guide plate 12 is connected to the back face guide plate returning device 17 for returning the back face guide plate 12 to a neutral position shown in FIGS. 8(_b_) and 8(_d_). The position returning device 17 has a mechanism for holding the position of a rod 17_c_ by means of springs 17_a_ and 17_b_ having the same elastic modulus. If the back face guide plate 12 is dragged by the pin rollers 5_a_, which are moved by the oscillation of the pin roller rolling teeth 11_a_ and 11_c_, linearly moves, the back face guide plate 12 can be returned to the original neutral position by the biasing force of the springs 17_a_ and 17_b_.

That is, when the trochoid tooth profiles of the pin roller rolling teeth 11_a_ and 11_c_ move so as to push the pin rollers 5_a_ out as the process from FIG. 8(_b_) to FIG. 8(_c_) or the process from FIG. 8(_d_) to FIG. 8(_e_), the back face guide plate 12 is dragged by the movement of the pin rollers 5_a_ to linearly move by a moving amount of δs. By this linear movement (translation motion), the spring 17_a_ of the back face guide plate returning device 17 is compressed, and the spring 17_b_ is pulled.

On the other hand, when the trochoid tooth profiles of the pin roller rolling teeth 11_a_ and 11_c_ simply roll and guide the pin rollers 5_a_ as the process from FIG. 8(_c_) to FIG. 8(_d_) or the process from FIG. 8(_e_) to FIG. 8(_b_), the back face guide plate 12 receives no drag from the pin rollers. Therefore, the spring 17_a_ of the back face guide plate returning device 17 push the back face guide plate 12 back, and the spring 17_b_ pulls the back face guide plate 12 back so that the back face guide plate 12 can be returned to the neutral position.

The upper guide portion 4$a$ of the tread guide rail 4 can alternately overlap with the back face guide plate 12 without interfering therewith it the dimensions of the recessed portions 42 and 42 are set as follows.

In a connecting portion in which the upper guide portion 4$a$ overlaps with the back face guide plate 12, it is assumed that the length of each of the recessed portions 42 and 43 is $\Delta s$ and the width of the overlapping portion of the upper guide portion 4$a$ of the tread guide rail 4 with the back face guide plate 12 at the neutral position shown in FIG. 8($b$) or ($d$) is $\Delta s$. In addition, assuming that the translation moving amount of the back face guide plate 12 dragged by the pin rollers 5 moved by the oscillation of the pin roller rolling teeth 11$a$ and 11$c$ is $\delta s$, $\Delta s$-$\Delta s$ is set to be greater than the translation moving amount $\delta s$. By setting so, even if the back face guide plate 12 linearly moves from the neutral position by $\delta s$ as shown in FIG. 8($c$), clearances always remain in the recessed portions 42 and 43, so that it is possible to surely avoid the interference with each other to maintain smooth operation.

Fourth Preferred Embodiment

Figure 9:
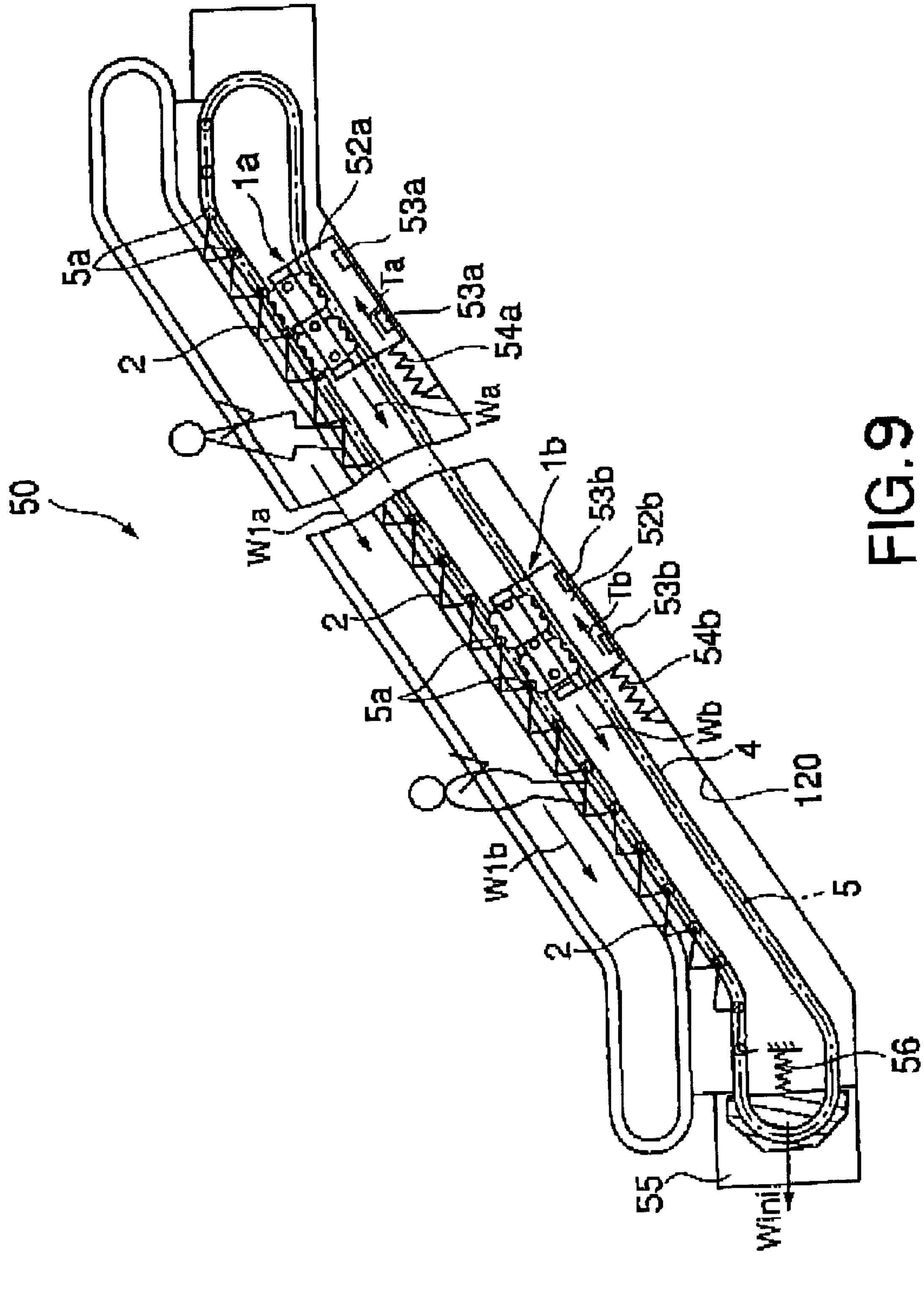
FIG. 9 is a schematic diagram the construction of the fourth preferred embodiment of a conveyor apparatus according to the present invention.
Figure 10:
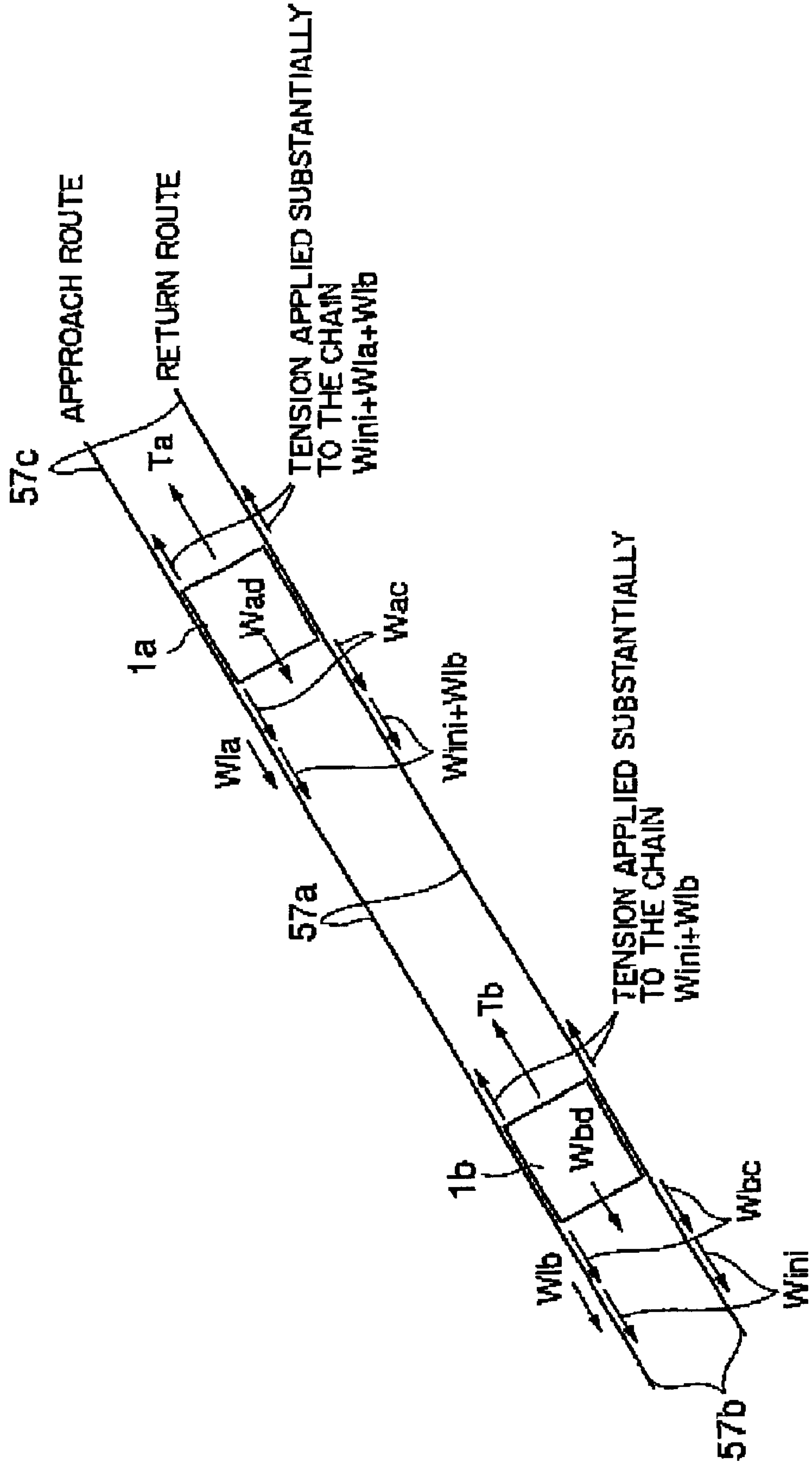
FIG. 10 is an illustration showing the balance of force applied to a chain of the conveyor apparatus of FIG. 9.

Referring to FIGS. 9 and 10, the fourth preferred embodiment of a conveyor apparatus according to the present invention will be described below.

FIG. 9 is a schematic diagram showing the construction of the fourth preferred embodiment of a conveyor apparatus according to the present invention. In the conveyor apparatus in this fourth preferred embodiment, a tread guide rail 4 provided on a structure 120, and a plurality of treads 2 moving along the tread guide rail 4 are the same as those in the above described third preferred embodiment. Similar to the conveyor apparatus in the first through third preferred embodiments, the plurality of treads 2 are connected to each other in the form of a loop by means of a pair of chains 5 (on both sides in direction perpendicular to the plane of FIG. 7) having pin rollers 5$a$. Driving mechanisms for driving the chain 5 are distributed and arranged on the way of the tread guide rail 4 at regular intervals The basic constructions of the driving mechanisms 1$a$ and 1$b$ are the same as that of the driving mechanism shown in FIG. 3, so that the same reference numbers are given to the same components to omit the detailed descriptions thereof The conveyor apparatus in this fourth preferred embodiment is constructed as an escalator having a difference in level in both gates. The housings 52$a$ and 52$b$ of the driving mechanisms 1$a$ and 1$b$ are installed on the structure 120, which is inclined at the same gradient as that of the tread guide rail 4, via supporting portions 53$a$ and 53$b$, respectively, so as to be slidable in the moving direction of the treads 2.

In order to apply constant force to the whole driving mechanisms 1$a$ and 1$b$, which are installed so as to be slidable, from the structure 120, chain tension biasing means 54$a$ and 54$b$ for increasing the tension of the chain 5 are provided. On the lower turning portion 55 of upper and lower turning portions of the treads 2, an initial tension adding means 56 for adding initial tension to the chain is provided. The chain tension biasing means 54$a$, 54$b$ and the initial tension adding means 56 can utilize the biasing force of springs or the like to bias the tension of the chain 5, and can remove sag even it the initial extension of the chain 5 or the like occurs.

FIG. 10 is a diagram schematically showing a balanced state of force acting the chain 5. In FIG. 10, for convenience of explanation, reference number 57$a$ denotes a chain from the lower turning portion to the lower stage driving mechanism 1$b$, and 57$b$ denotes a chain of a portion above the driving mechanism 1$b$.

In FIG. 10, the balance of force with respect to the lower diving mechanism 1$b$ will be first considered. In FIG. 10, Wbc denotes a gradient angular component of weight of the chain 57$b$, and wbd denotes a gradient angular component of weight of the driving mechanism 1$b$ itself, Wini denoting an initial tension applied to the chain 57$b$ from the initial tension adding means 56, and Wlb denoting a gradient angular component of weight of passengers and cargo, which acts on the driving mechanism 1$b$ from the lower turning portion 55 (Wlb will he hereinafter referred to as a variable load weight since it varies in accordance with operation state). These forces act on the chain 57$b$ downwards in parallel.

On the other hand, it is assumed that force that the chain tension biasing means 54$b$ biases the chain 57$b$ upward in parallel while the lower driving mechanism 1$b$ drives the chain 57$b$ is Tb. This chain biasing force Tb always acts, the tension of the chain 5 can be managed as follows. That is, if the magnitude of the chain biasing force Tb is set to be substantially equal to the gradient angular component Wbc of weight of the chain 57$b$ and the gradient angular component Wbd of weight of the driving mechanism 1$b$, the chain tension biasing means 54$b$ can support weight corresponding to the sum Wb (which will be hereinafter referred to as a fixed load weight Wb since it is constant every conveyor apparatus) of the gradient angular component wbc of weight of the chain 57$b$ and the gradient angular component Wbd of weight of the driving Mechanism 1$b$. Therefore, the fixed load weight Wb is not applied to the chain 57$a$ above the driving mechanism 1$b$, so that the tension substantially acting on the chain 57$a$ is reduced to Wini+Wlb which is the total of the initial tension wini applied from the initial tension adding means 56 and the above described variable load weight wlb.

Moreover, also in the balance of force with respect to the upper driving mechanism 1$a$, if the magnitude of the chain biasing force Ta of the chain tension biasing means 54$a$ is set to be substantially equal to the sum Wa (which will be hereinafter referred to as a fixed load weight Wb since it is constant every conveyor apparatus) of the gradient angular component Wac of weight of the chain 57$a$ and the gradient angular component Wad of weight of the driving mechanism 1$a$ itself, the chain tension biasing means 54$a$ can support the fixed load weight Wa which is the total of the gradient angular component Wac of weight of the chain 57$a$ and the gradient angular component Wad of weight of the driving mechanism 1$b$ Therefore, the fixed load weight Wa is not applied to a portion of the chain 57$c$ above the driving mechanism 1$a$, so that the actually acting tension can be reduced to the sum of the above described tension Wini+Wlb, which acts from the chain 57$a$, and the variable load weight Wlb which a gradient angular component of the total weight of passengers and cargo from the driving mechanism 1$b$ to the driving mechanism 1$a$ , i. e., to Wini+Wla+Wlb.

In short, as the whole chain 5, the chain tension biasing means 54$a$ and 54$b$ bear the fixed load weights Wa and Wb, so that the load applied to the chain can be lighten by that weights. Furthermore, since the variable load weights wia and Wlb are zero when no load is applied, at least the initial tension Wini is applied to the whole chain 5.

Figure 11:
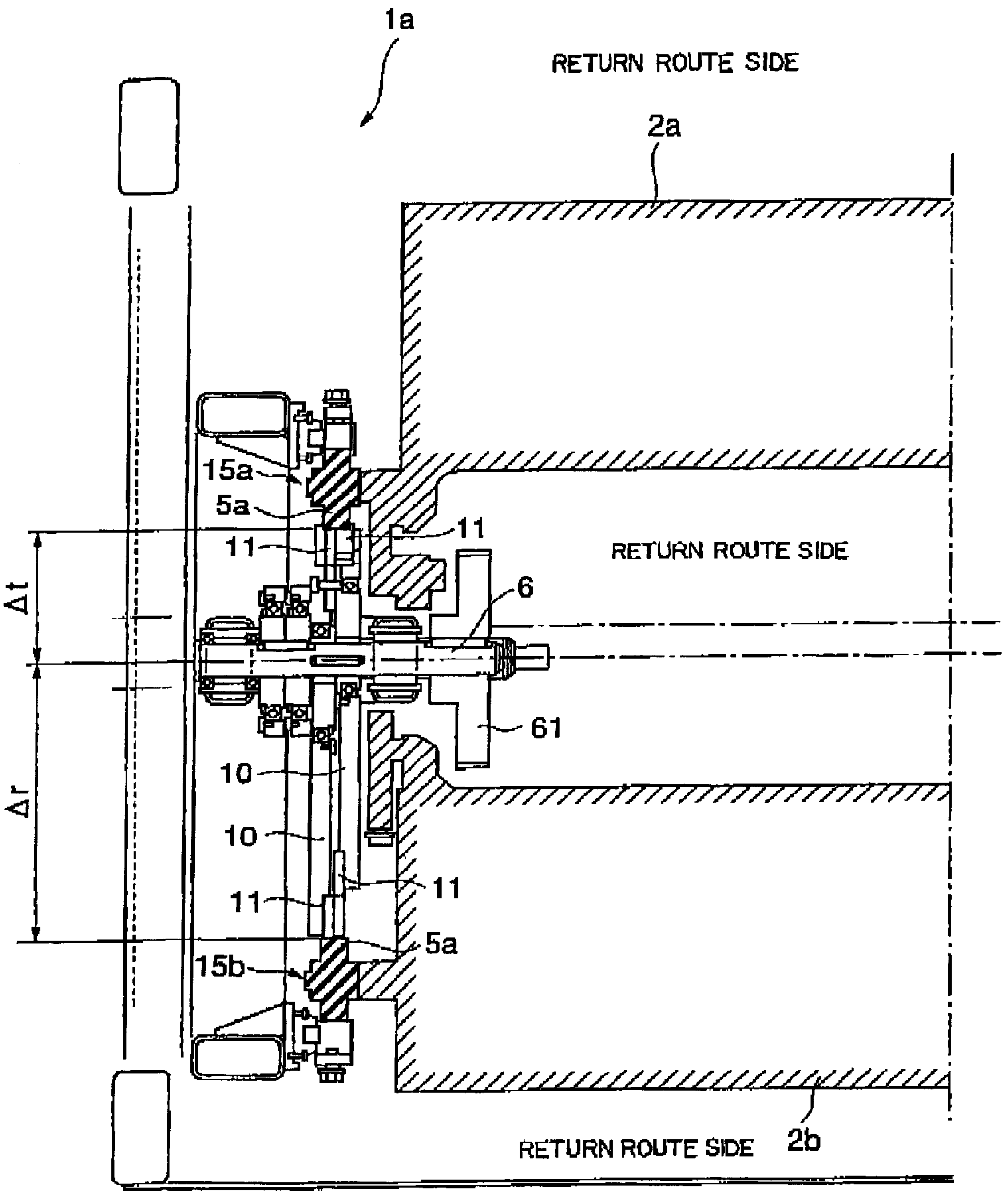
FIG. 11 is a sectional view of a driving mechanism of FIG. 9.

In the above described preferred embodiments, the load of the chain 5 is lightened by additionally providing the chain tension biasing means 54$a$ and 54$b$ in the driving mechanisms 1*a* and 1*b*, respectively. FIG. 11 sows a driving mechanism 1*a* or 1*b* wherein at variable load weight Wla or Wlb is supported on a pin roller rolling teeth. In this case, the driving mechanisms 1*a* and 1*b* have the same construction. Therefore, referring to FIGS. 8, the driving mechanism 1*a* will be described below. Furthermore, in FIG. 11, the same reference numbers as those in FIG. 3 denote the same components.

In FIG. 11, Δt denotes a distance between the axis of the eccentric crank shaft 6 and the approach route side chain 15*a*, and Δr denotes a distance between the axis of the eccentric crank shaft 6 and the return route side chain 15*b*. In this case, Δt is different from Δr, and the distance Δr to the return route side is longer than Δt.

On the oscillating plate 10, a pair of trochoid-shaped pin roller rolling teeth 11 are distributed forward and rearward on each of the approach route side and the return route side. Each of the pin roller rolling teeth 11 are mounted on the oscillating plate 10 so as to maintain the engagement with the pin rollers 5*a* of the chain 5. Thus in the driving mechanism far converting the oscillating motion of the oscillating plate 10 into thrust for the chain by means of the trochoid-shaped pin roller rolling teeth, the relative position of the eccentric crank shaft 8 with respect to the approach route side chain 15*a* and the return route side chain 15*b* can be freely set, so that the design layout is flexible. In particular, the size of the driving mechanism in height direction can be easily decreased.

In addition, the gradient angular components of the fixed load weight and variable load weight applied to the return route side chain 15*b* can be supported on the approach route side pin roller rolling teeth 11. The gradient angular components of the fixed load weight and variable load weight applied to the approach route side chain 15*a* can also be supported on the return route side pin roller rolling teeth 11. Therefore, the whole weights of the chains 15*a* and 15*b* can be shared by the approach route side pin roller rolling teeth 11 and the return route side pin roller rolling teeth 11, respectively, so that it is possible to lighten the load applied to the chains 15*a* and 15*b*.

Fifth Preferred Embodiment

Figure 12:
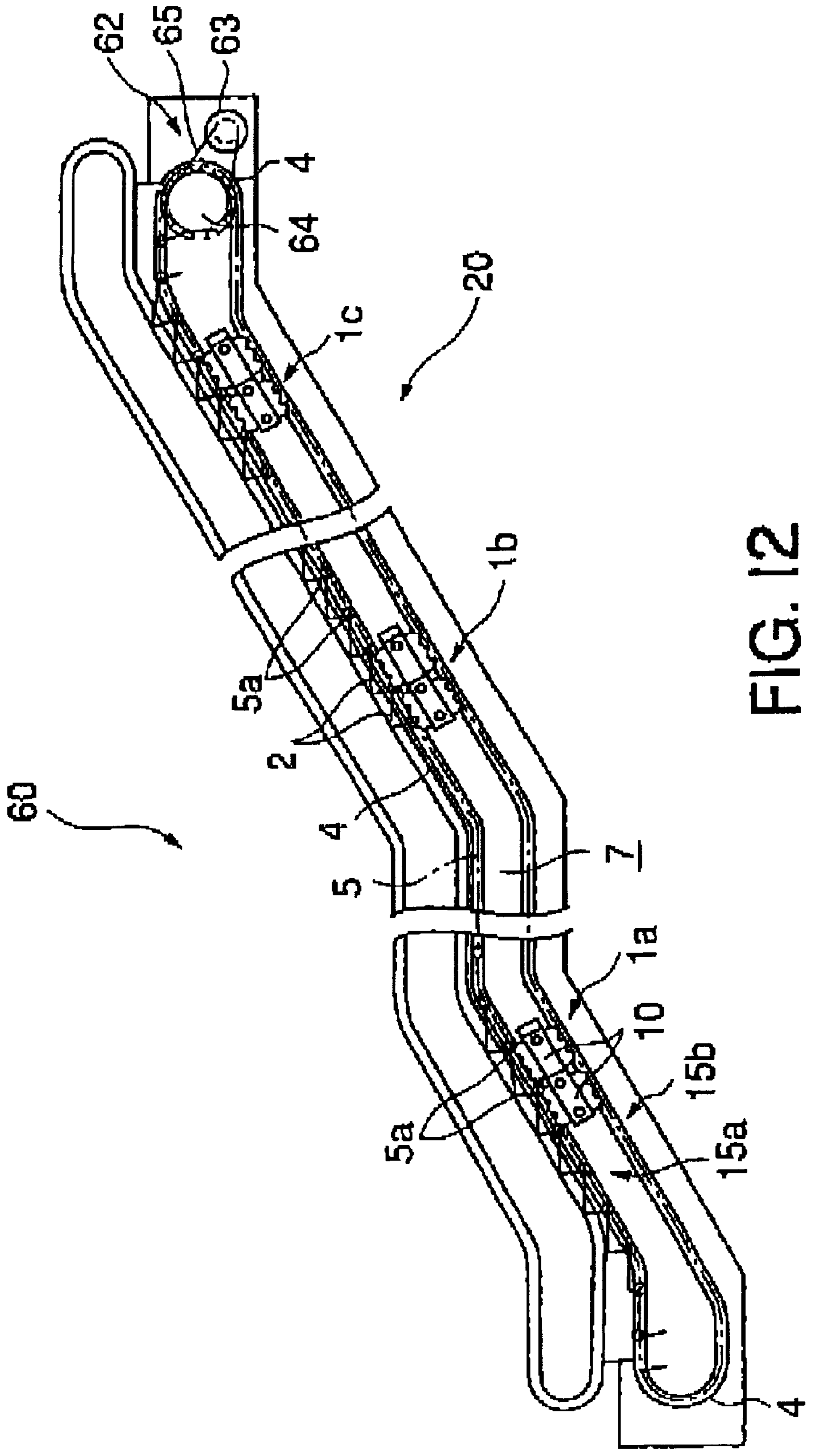
FIG. 12 is a schematic diagram showing the fifth preferred embodiment of a conveyor apparatus according to the present invention.

Referring to FIG. 12, the fifth preferred embodiment of a conveyor apparatus according to the present invention will be described below.

FIG. 12 is a diagram schematically showing the construction of the conveyor apparatus 60 in the fifth preferred embodiment. Similar to the conveyor apparatus 20 shown in FIG. 1, the conveyor apparatus 60 has a distributed driving mechanism wherein the driving mechanisms 1*a* through 1*c* are distributed and arranged on the way of the chain 5 at regular intervals. The construction of each of the distributed driving mechanisms 1*a* through 1*c* is the same as that of the driving mechanism 1*a* shown in FIG. 3, so that the descriptions thereof are omitted.

The difference between the conveyor apparatus 60 in this fifth preferred embodiment and that in any one of the above described preferred embodiments is that a driving mechanism 62 for driving the returning portion of the chain 5 on the upper floor is provided below the gate on the upper floor, in addition to the distributed driving mechanisms 1*a* through 1*c*.

This driving mechanism 62 includes a driving motor 63, a sprocket 64, and a chain 65 for transmitting power of the driving motor 63 to the sprocket 64, and is a driving mechanism which is normally adopted in conventional elevators.

Since the driving mechanism 62 is associated with the distributed driving mechanisms 1*a* through 1*c* for driving the chain 5, the driving force generated from the driving mechanism 62 is sufficient if it can carry weight corresponding to the gradient angular component (corresponding to the above described variable load weight) of the total weight of passengers and cargo from the uppermost distributed driving mechanism 1*c* to the driving mechanism 62, so that the driving motor 63 having a small capacity can sufficiently cope with it. On the other hand, the driving forces required for the lowermost distributed driving mechanism 1*a*, the intermediate distributed driving mechanism 1*c* and the upper distributed driving mechanism 1*c* are sufficient if each of the driving forces can carry the variable load weight from the turning portion of the chain on the lower floor, the variable load weight from the distributed driving mechanism 1*a* to the distributed-driving mechanism 1*b*, and the variable load weight from the distributed driving mechanism 1*b* to the distributed driving mechanism 1*c*, respectively. Therefore, each of the distributed driving mechanisms 1*a* through 1*c* does not require a large capacity of driving motor, and the conveyor apparatus uses the distributed driving mechanisms 1*a* through 1*c* together with the inexpensive driving mechanism 62, so that it is possible to reduce the production costs.

Sixth Preferred Embodiment

Figure 13:
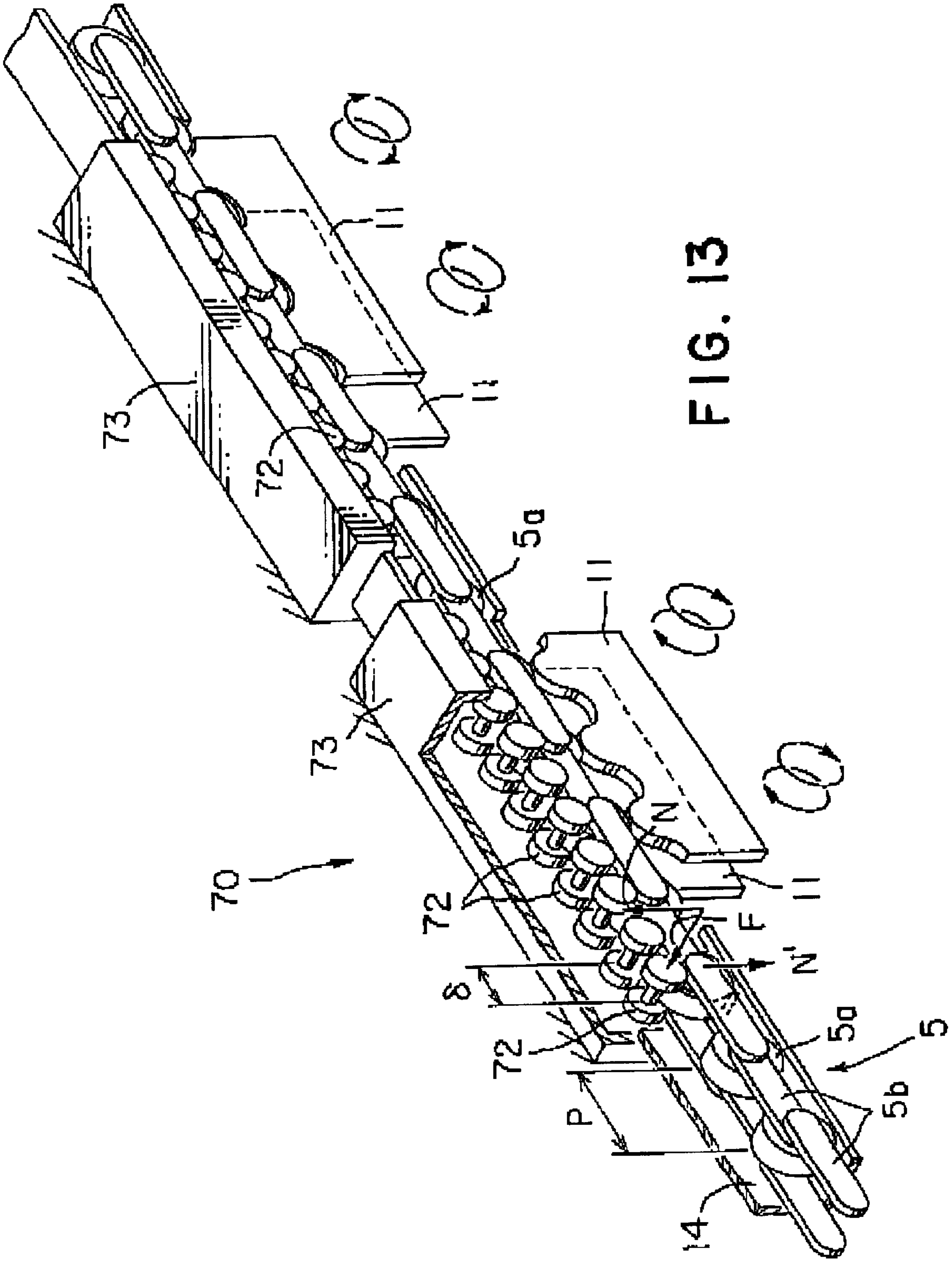
FIG. 13 is a perspective view showing the construction of a back face supporting roller for backup supporting a chain in the sixth preferred embodiment of a conveyor apparatus according to the present invention.
Figure 14B:
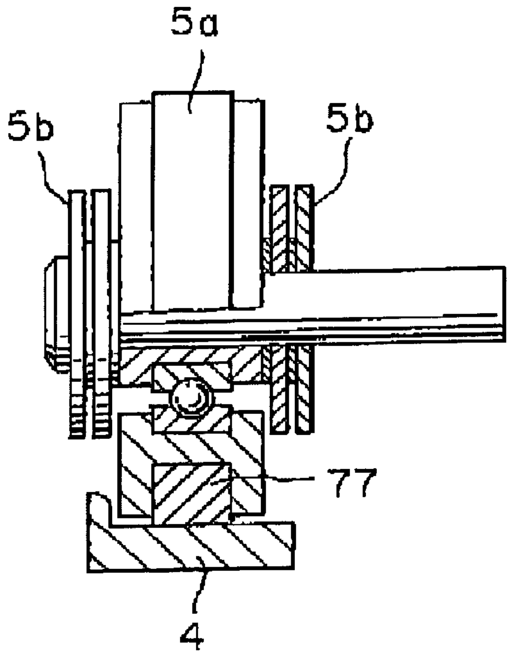
FIG. 14 is a sectional view showing the details of the back face supporting roller of FIG. 13.
Figure 14A:
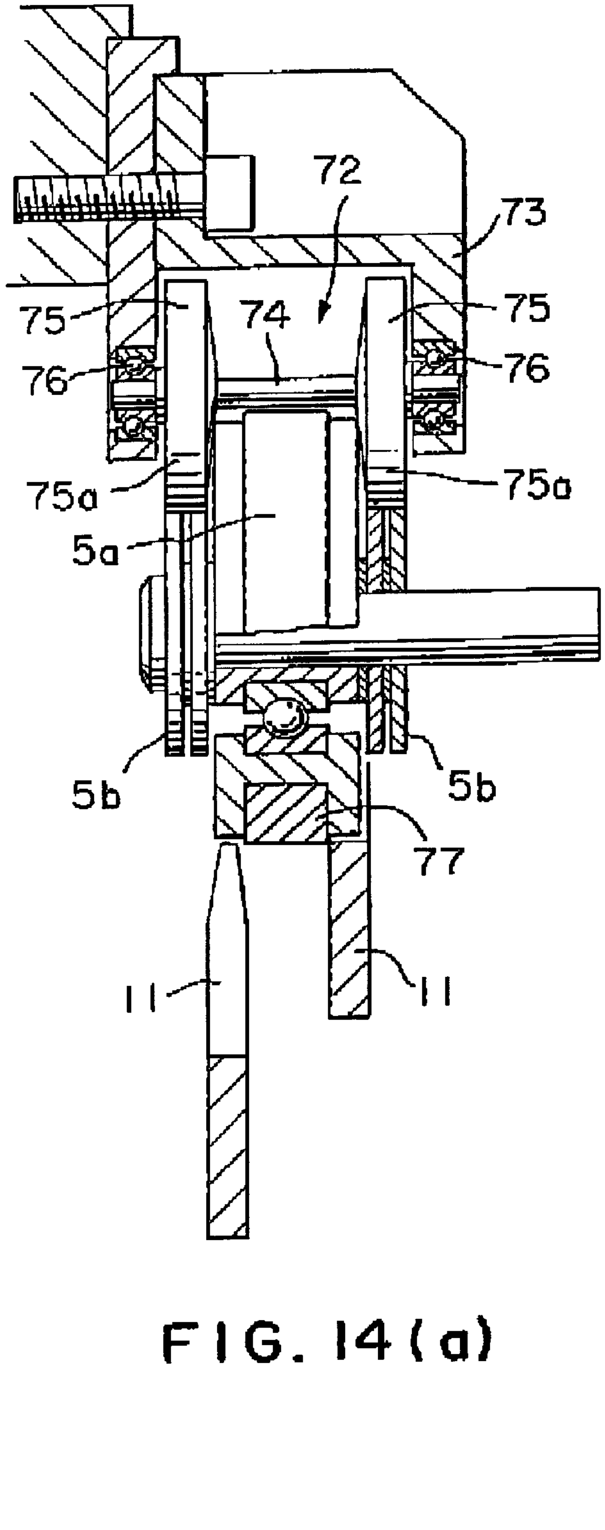

Referring to FIGS. 13 and 14, the sixth preferred embodiment of a conveyor apparatus according to the present invention will be described below.

FIG. 13 is a perspective view showing a principal part of a driving mechanism 70 of the conveyor apparatus in the sixth preferred embodiment. Links 5*b* constituting the chain 5 continuously connect the pin rollers 5*a* at regular intervals (pitch length P). The structure and arrangement of the pin roller rolling teeth 11 are the same as those in the above described preferred embodiments.

This sixth preferred embodiment is characterized in that a plurality of back face supporting rollers 72 for rolling the links 5*b* of the chain 5 are provided above the pin roller rolling teeth 11. The back face supporting rollers 72 are arranged in an elongated box-shaped roller housing 73, the bottom of which is open, at regular intervals δ in the longitudinal directions of the chain 5. In this case, the back face supporting rollers 72 are preferably arranged at intervals of P/2 or less so that the interval δ is shorter than the pitch length P of the chain 5.

As shown in FIG. 14(*a*), each of the back face supporting rollers 72 includes a rotation shaft 72 and a pair of rolling elements 75 which are fixed to the rotation shaft 74 The rotation shaft 74 of each of the back face supporting rollers 72 is rotatably supported on the roller housing 73 via a bring 76. The distance between the rolling elements 75 is set to be substantially equal to the links 5*b* which are arranged on both sides of each of the pin rollers 5*a* of the chain 5, so that the rolling elements 75 can roll on the top edge portions of the links 5*b* serving as rolling contact surfaces without interfering with the pin rollers 5*a*. The rolling surface 75*a* of the outer peripheral surface of each of the rolling elements 75 rolling on the links 5*b* is coated with a thin film of a material, such as plastic or rubber having a high ability to absorb vibrations and noises. The rolling body 75 is made of a damping steel product which has sufficient rigidity and excellent ability to absorb vibrations and noises.

On the other hand, as shown in FIG. 14(*b*), a cushion ring 77 of a ring-shaped plastic or the like is mounted on the outer peripheral portion of each of the pin rollers 5*a* of the chain 5, which rolls on the tread guide rail 4, and the pin rollers 5*a* of the chain 5 are designed to roll on the tread guide rail 4 via the cushion ring 77. In this case, the width of the cushion ring 77 is narrower than the width of the pin roller 5, and the outer peripheral surface on both sides of the cushion ring 77 of the pin roller 5*a* is designed to be thrust while rolling on the trochoid-shaped teeth of the pin roller rolling teeth 11. Therefore, the body of the pin roller 5*a* is formed of a steel product having a high rigidity so as not to be deformed, unlike the material of the cushion ring 77.

The pin roller rolling teeth 11 require sufficient rigidity similar to the pin rollers 5*a* and are made of a damping steel product, which has sufficient rigidity and which has vibration absorbing effects, so as to be able to absorb vibrations and noises which are generated when thrust is given to the pin rollers 5.

The operation of the driving mechanism 70 of the conveyor apparatus in the sixth preferred embodiment will be described below.

In FIG. 13, while the pin roller rolling teeth 11 engage the pin rollers 5*a* of the chain 5 to give thrust to the chain 5 in accordance with the oscillation of the pin roller rolling teeth 11, the back face supporting roller 72 backup-supports thereon the chain 5 from the opposite side to the pin roller rolling teeth 11 while rolling the links 5*b* of the chain 5. That is, assuming that force acting on the chain 5 from the pin roller rolling teeth 11 is F, the back face supporting roller 72 held on the roller housing 73 receives a vertical drag N, which is a component in a direction perpendicular to the traveling direction of the chain 5, with respect to the force F while rolling on the links 5*b* of the chain 5, and push the chain 5 against the pin roller rolling teeth 11 by its reaction force N'. Therefore, since it is possible to prevent sliding from occurring between the pin rollers 5*a* and the trochoid-shaped teeth of the pin roller rolling teeth 11 engaged therewith, structural work loss can not only be reduced, but the pin rollers 5*a* can also tightly hold thrust given from the pin roller rolling teeth 11, so that it is possible to maintain the mechanism principle that the pin roller rolling teeth 11 having trochoid-shaped teeth move the pin rollers 5*a* at a constant velocity.

In this preferred embodiment, the interval δ between the plurality of back face supporting rollers 72 held on the roller housing 73 is shorter than the pitch length P of the links 5*b* of the chain 5, so that moment generated by the vertical drag N around the back face supporting rollers 72 does not increase. Therefore, the reaction force N' for backup supporting the pin rollers 5*a* in the front and rear portions of each of the back face supporting rollers 72 is not greater than the vertical drag N, so that it is not required to take measures to cope with the reinforcement of the tread guide rail 4.

In addition, since the rolling surface of the rolling element 75 of the back face supporting roller 72 is coated with plastic or the like, mechanical shock intermittently applied to the rolling element 75 due to the vertical drag N is effectively absorbed. Moreover, since the cushion ring 77 is mounted on the pin roller 5*a*, mechanical shock transmitted froze the tread guide rail 4 is reduced by the cushion ring 77, so that the occurrence of vibrations and noises is inhibited

Seventh Preferred Embodiment

Figure 15:
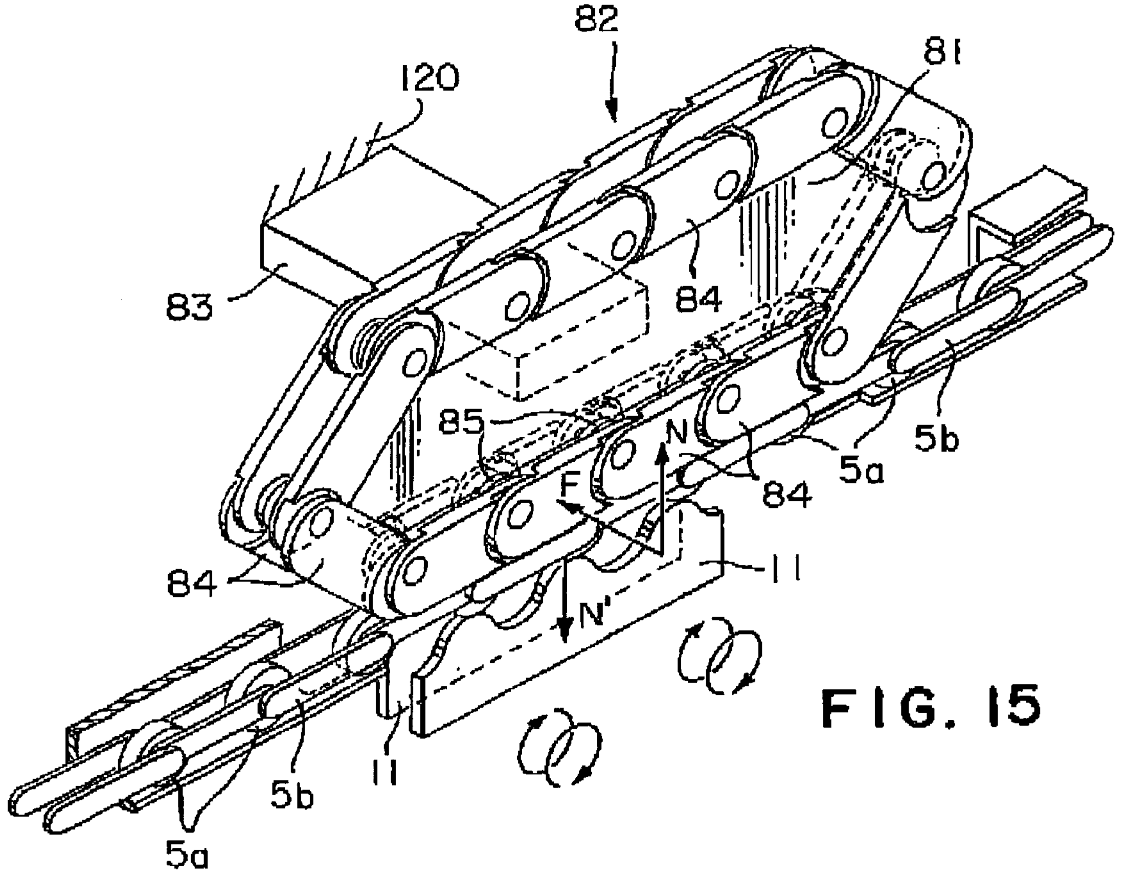
FIG. 15 is a perspective view showing a back face supporting circulating wire rope for backup supporting a chain in the seventh preferred embodiment of a conveyor apparatus according to the present invention.
Figure 16:
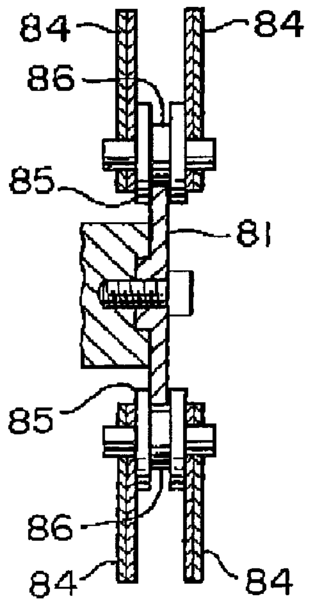
FIG. 16 is a sectional view of the back face supporting circulating wire rope of FIG. 15.
Figure 17A:
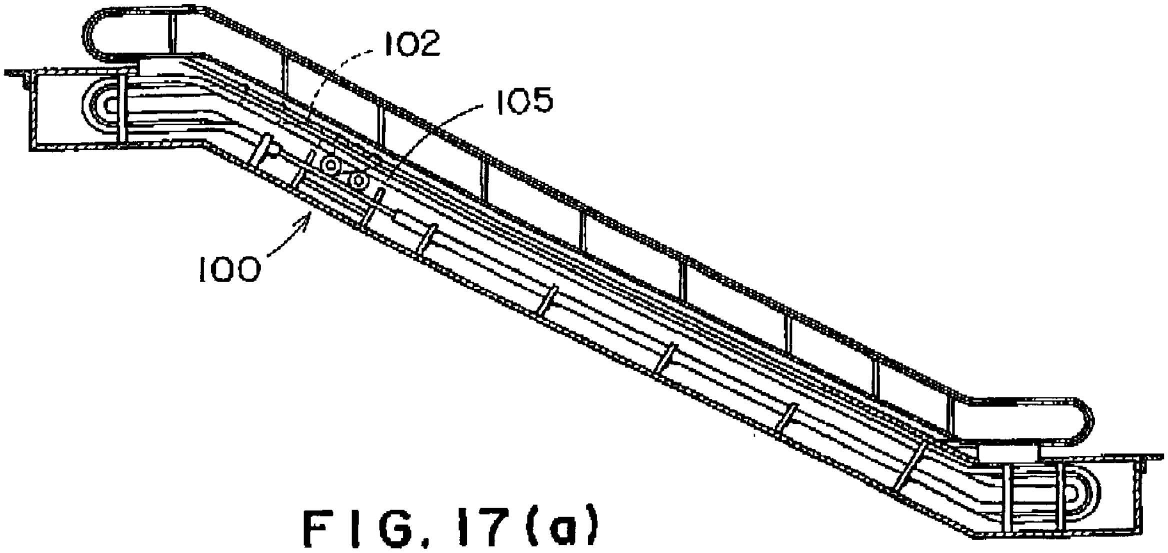
FIG. 17 is a schematic diagram showing the construction of a conventional conveyor apparatus.
Figure 17B:
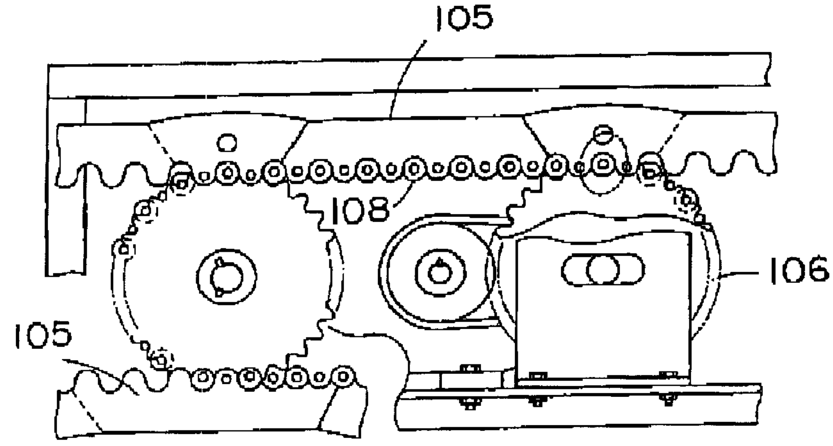
Figure 18:
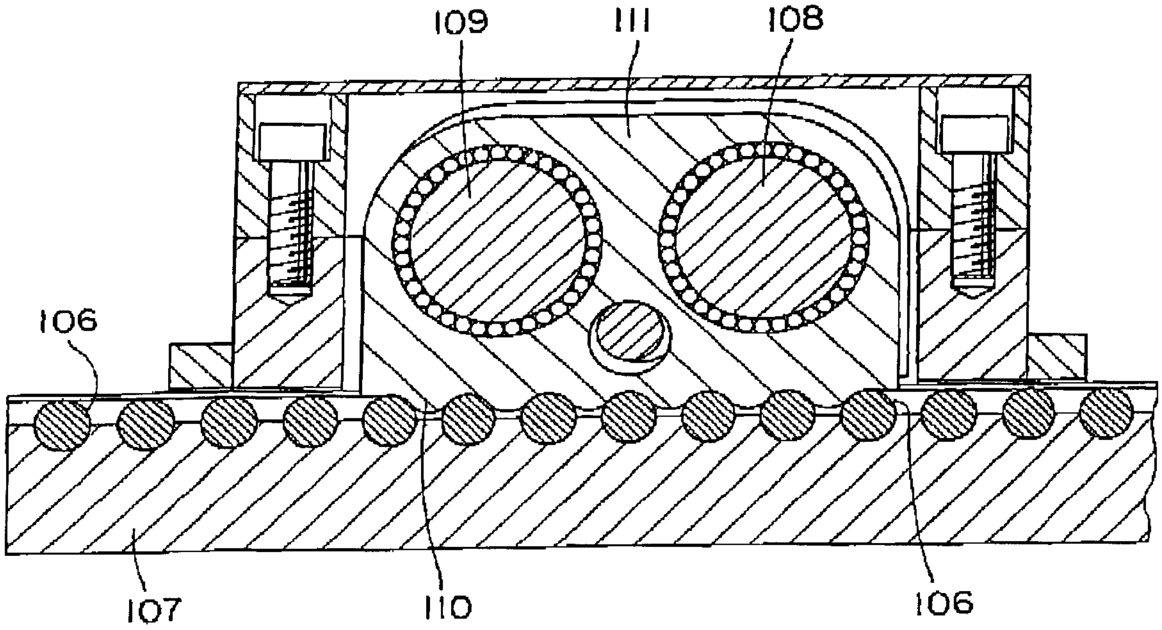
FIG. 18 is a schematic diagram showing the basic construction of a reduction gear using a trochoid tooth profile.

Referring to FIGS. 15 and 16, the seventh preferred embodiment of a conveyor apparatus according to the present invention will be described below.

The difference between the seventh preferred embodiment and the sixth preferred embodiment is that an endless loop back face supporting means is provided in place of the back face supporting roller 72.

FIG. 15 is a diagram showing an endless loop back face supporting means for backup supporting thereon the chain 5 from the opposite side to the pin roller rolling teeth 11 in the driving mechanism of a conveyor apparatus 80. Furthermore, in FIG. 15, the same reference numbers are given to the same components as those in FIG. 13 to omit the detained descriptions thereof.

The back face supporting means includes an elliptical back face supporting guide 81, and a back face supporting wire rope body 82 which extend along the outer peripheral portion of the back face supporting guide 81 so as to form an endless loop.

The back face supporting guide 81 is mounted on a supporting member 831 which extends from the structure 120, so as to be parallel to the chain 5. The back face supporting wire rope body 82 comprises wire rope links 84 which are continuously connected to each other by guide rollers 85 so as to an endless loop. Each of the guide rollers 85 is rotatably mounted, and is designed to engage a peripheral groove 82 , which is formed in the outer peripheral portion, while rolling on the outer peripheral portion of the back face supporting guide 81 as shown in FIG. 16.

In the back face supporting wire rope body 82, a series of lower wire rope links 84 are designed to contact the links 5*b* of the chain 5 from the opposite side to the pin roller rolling teeth 11. Therefore, the back face supporting wire rope body 82 tightly supports thereon the chain 5 while circulating moving in accordance with the movement of the chain 5. That is, if the vertical drag N of a component in a direction perpendicular to the traveling direction of the chain 5, of force F received by the pin roller 5*a* of the chain 5 from the pin roller rolling teeth 11, acts on the wire rope link 84, the guide roller 85 supported on this wire rope link 84 receives vertical reaction force N' while rolling, and the reaction force N' also pushes the wire rope link 84 against the chain 5. Therefore, it is possible to prevent sliding from occurring between the pin roller 5*a* and the trochoid-shaped teeth of the pin roller rolling teeth 11 engaged therewith, so that it is possible to reduce structural work loss due to friction force and heat generation.

Furthermore in order to reduce mechanical shock due to the vertical drag intermittently acting Via the chain from the pin roller rolling teeth 11, the wire rope link 84 of the back face supporting wire rope body 82 is preferably formed of a damping steel product which has sufficient rigidity and which has an ability to absorb vibrations and noises. The portion of the wire rope link 84 contacting the link 5*b* of the chain 5 is preferably coated with a thin film of a plastic or the like which absorbs vibrations and noises.

What is claimed is:

1. A conveyor apparatus comprising:

a tread guide rail which is provided on a structure;

a plurality of treads which move along said tread guide rail;

a chain for connecting said plurality of treads in the form of an endless loop;

a rotation drive unit which is mounted on said structure; and driving means for converting a rotational motion, which is transmitted from said rotation drive unit via an eccentric shaft, into an oscillating motion of an oscillating body to give thrust to said chain from said oscillating body via a pin roller, which is provided on one of said oscillating body and said chain, and a trochoid tooth profile which engages said pin roller.

2. A conveyor apparatus as set forth in claim 1, wherein said driving means comprises an eccentric crank shaft which is connected to said rotation drive unit and which eccentrically rotates;

an oscillating body which is connected to said eccentric crank shaft and which oscillates in accordance with the eccentric rotation of said eccentric crank shaft; and trochoid-shaped pin roller rolling teeth which are provided on an end portion of said oscillating body and which give thrust to said pin roller in accordance with the oscillation of said oscillating body.

3. A conveyor apparatus as set forth in claim 1, wherein said driving means comprises:

trochoid-shaped pin roller rolling teeth which are provided on a plurality of links constituting said chain;

an eccentric crank shaft which is connected to said rotation drive unit and which eccentrically rotates;

an oscillating body which is connected to said eccentric crank shaft and which oscillates in accordance with the eccentric rotation of said eccentric crank shaft; and an eccentrically oscillating pin roller which is provided on an end portion of said oscillating body and which gives thrust to said pin roller rolling teeth in accordance with the oscillation of said oscillating body.

4. A conveyor apparatus as set forth in claim 1, wherein said driving means is a distributed driving mechanism which comprises a plurality of said driving means distributed and arranged along a linearly extending chain.

5. A conveyor apparatus as set forth in claim 1, wherein said tread guide rail comprise a pair of members which has a C-shaped cross section and which has an opening portion directed downward.

6. A conveyor apparatus as set forth in claim 1 or 5, wherein said pin roller engages said tread guide rail.

7. A conveyor apparatus as set forth in claim 1, wherein a back face guide plate for guiding said pin roller on the opposite side to a side on which said pin roller rolling teeth are positioned with respect to said pin roller is provided on said structure so as to extend along said tread guide rail.

8. A conveyor apparatus as set forth in claim 7, wherein said back face guide plate has such an extent of hardness that said back face guide plate does not damage said pin roller.

9. A conveyor apparatus as set forth in claim 8, wherein said back face guide plate is exchangeable.

10. A conveyor apparatus as set forth in any one of claims 7 through 9, wherein said back face guide plate is linearly movable in the circulating direction of said chain by a moving amount which is not greater than the eccentricity amount of said eccentric crank shaft, and which further comprises a back face guide plate returning device for returning said back face guide plate to the original position when said back face guide plate linearly moves.

11. A conveyor apparatus as set forth in claim 1 or 2, wherein said chain has a plurality of links having a length which is equal to the pitch of said plurality of treads, and a tread guide roller engaging said tread guide rail is provided on an end portion of each of said links, said pin roller being provided on each of said links.

12. A conveyor apparatus as set forth in claim 2, wherein said pin roller rolling teeth are detachably mounted on said oscillating body.

13. A conveyor apparatus as set forth in claim 12, wherein said pin roller rolling teeth or said oscillating body are provided with a position fine control device capable of adjusting the mounting positions of said pin roller rolling teeth and said oscillating body in the circulating direction of said chain.

14. A conveyor apparatus as set forth in claim 2, wherein a plurality of oscillating bodies, each of which is the same as said oscillating body, are chained with each other via an idler eccentric crank shaft to be distributed and arranged forward and rearward in the circulating direction of said chains.

15. A conveyor apparatus as set forth in claim 14, wherein said plurality of oscillating bodies are arranged so that the phase shift between the eccentric angles of adjacent two of said plurality of oscillating bodies is equal to another, and at least one of said plurality of oscillating bodies is provided with a mass balance adjusting device capable of adjusting the weight and mounting position of a fine additional weight.

16. A conveyor apparatus as set forth in claim 14, wherein pin roller rolling teeth engaging both of an approach route side and return route side of said chain reciprocating and circulating is mounted on each of said oscillating bodies to give thrust to a pin roller of each of said approach route side and return route side of said chain.

17. A conveyor apparatus as set forth in claim 16, wherein said eccentric crank shaft connected to said oscillating bodies is arranged at a position at which the distance between said eccentric crank shaft and said chain an said approach route side is different from the distance between said eccentric crank shaft and said chain on said return route side, and said pin roller rolling teeth mounted on both of said approach route side and said return route side have the same tooth profile to maintain the engagement of said chain with said pin rollers.

18. A conveyor apparatus as set forth in claim 17, wherein a tread guide roller engaging said tread guide rail is provided on an end portion of each of said links.

19. A conveyor apparatus as set forth in claim 12, wherein a plurality of oscillating bodies, each of which is the same as said oscillating body, are combined with each other to be connected to said eccentric crank shaft so that the eccentric phase angle of each of said oscillating bodies is shifted by an angle which is obtained by substantially equally dividing 360°.

20. A conveyor apparatus as set forth in claim 19, wherein said oscillating bodies are arranged so as to be alternately distributed in forward and rearward sets in the traveling direction of said chain in accordance with the magnitude of said eccentric phase angle.

21. A conveyor apparatus as set forth in claim 20, wherein said pin roller rolling teeth mounted on each of said oscillating bodies have the same trochoid tooth profile, said pin roller tolling teeth being arranged in each of said oscillating bodies in a phase difference in the traveling direction of said chain so as to said pin roller by a pitch P of said teeth when said crank shaft makes one rotation.

22. A conveyor apparatus as set forth in claim 5, wherein said tread guide rail has a stepped shape portion, said stepped shape portion having a recessed portion for avoiding the interference with said pin roller rolling teeth, and a portion which always overlap with said pin roller rolling teeth.

23. A conveyor apparatus as set forth in claim 10, wherein each of said tread guide rail and said back face guide plate has a recessed portion for avoiding the interference of said tread guide rail with said back face guide plate, said tread guide rail overlapping with said back face guide plate via said recessed portion.

24. A conveyor apparatus as set forth in claim 2 or 3, which further comprises:

means for supporting said driving mechanism so that said driving mechanism is slidable in the traveling direction of said chain;

means for biasing said driving mechanism in a direction in which tension is applied to said chain; and initial tension adding means, arranged in a turning portion of said chain, for adding initial tension to said chain.

25. A conveyor apparatus as set forth in claim 4, wherein a sprocket engaging a turning portion of said chain, and a driving part having a driving motor for driving said sprocket, together with said distributed driving mechanism, are provided.

26. A conveyor apparatus as set forth in claim 7, which further comprises a plurality of back face supporting roller which is rotatably supported on said structure and which rolls along a link for connecting said pin roller of said chain in the opposite side to a side in which said pin roller rolling teeth are arranged, in place of said back face guide plate.

27. A conveyor apparatus as set forth in claim 26, wherein the interval of said back face supporting roller is set to be ½ or less with respect to the pitch length P of said link of said chain.

28. A conveyor apparatus as set forth in claim 26, wherein a coating layer of a material having an ability to absorb vibrations is formed on a rolling surface of the cuter peripheral surface of said back face supporting roller.

29. A conveyor apparatus as set forth in claim 28, wherein the body of said back face supporting roller is formed of a damping steel product.

30. A conveyor apparatus as set forth in claim 26, wherein a cushion ring forming rolling surfaces to said tread guide rail is mounted on the outer peripheral surface of said pin roller of said chain, said rolling surfaces to said pin roller rolling teeth being formed on both sides of said cushion ring.

31. A conveyor apparatus as set forth in claim 26, which further comprises: a back face supporting wire rope body formed by connecting wire rope links, which contact links for connecting said pan rollers of said chain on the opposite side to a side on which said pin roller rolling teeth are arranged, via a guide roller in the form of an endless loop; and a hack face supporting guide for guiding the circulating movement of said back face supporting wire rope body by the rolling of said guide roller, in place of said back face supporting roller.

32. A conveyor apparatus as set forth in claim 31, wherein a coating layer of a material having an ability to absorb vibrations is formed on a surface of each of said wire lope links contacting said link of said chain.

33. A conveyor apparatus as set forth in claim 32, wherein said wire rope links are formed of a damping steel product.

* * * * *

UNITED STATES PATENT AND TRADEMARK OFFICE

CERTIFICATE OF CORRECTION

PATENT NO. : 6,427,823 B1
DATED : August 6, 2002
INVENTOR(S) : Ishikawa et al.

It is certified that error appears in the above-identified patent and that said Letters Patent is hereby corrected as shown below:

Title page,
Item [30], Foreign Application Priority Data should read:

-- [30] Foreign Application Priority Data

Apr. 15, 1999 (JP) ........................ 11-108197 --

Signed and Sealed this

Fourteenth Day of January, 2003

JAMES E. ROGAN
*Director of the United States Patent and Trademark Office*